Figure 7:
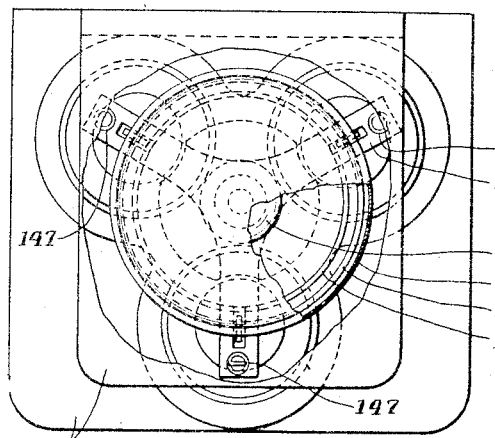

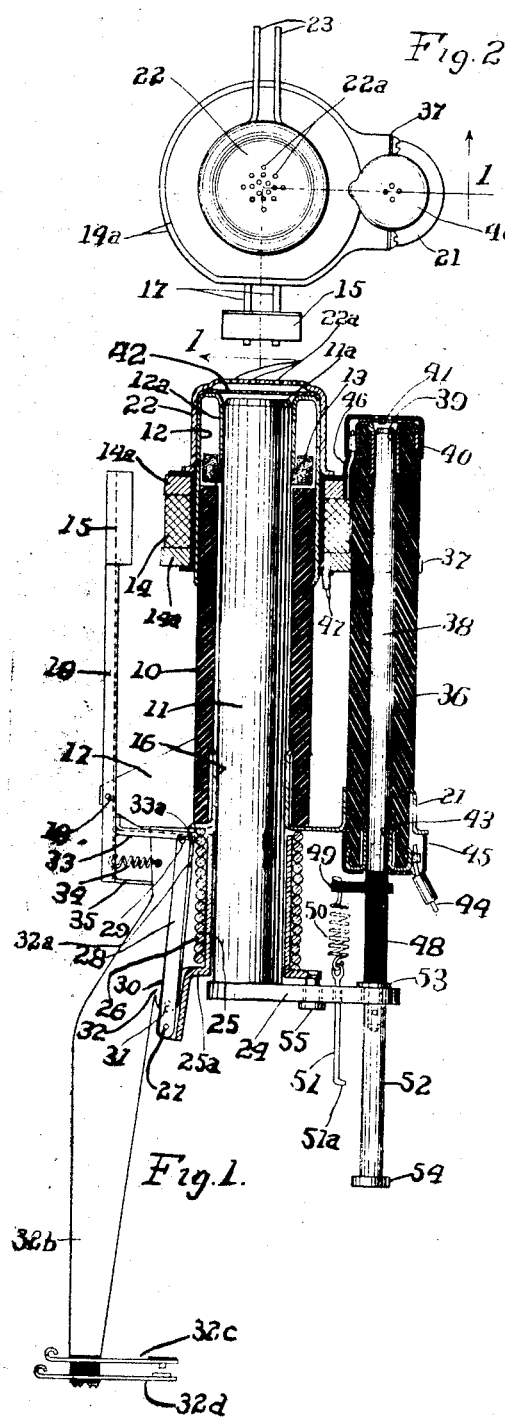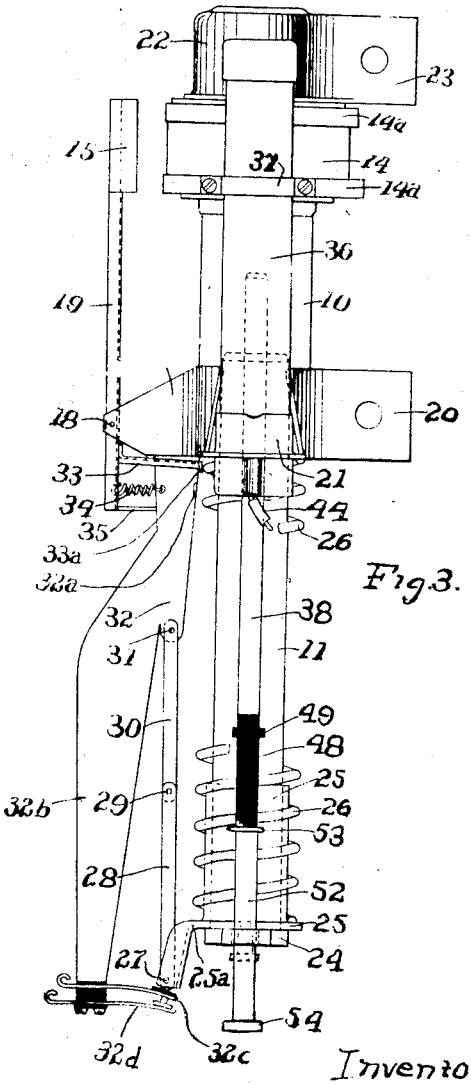

Feb. 10, 1931. L. E. KING 1,792,310
ELECTRIC PROTECTIVE SYSTEM AND APPARATUS THEREFOR
Filed July 23, 1923 7 Sheets-Sheet 2

Inventor
Lloyd E. King.
By Albert C. Bell
Attorney.

Inventor
Lloyd E. King.
By Albert C. Bell
Attorney.

Feb. 10, 1931.     L. E. KING     1,792,310
ELECTRIC PROTECTIVE SYSTEM AND APPARATUS THEREFOR
Filed July 23, 1923     7 Sheets-Sheet 4
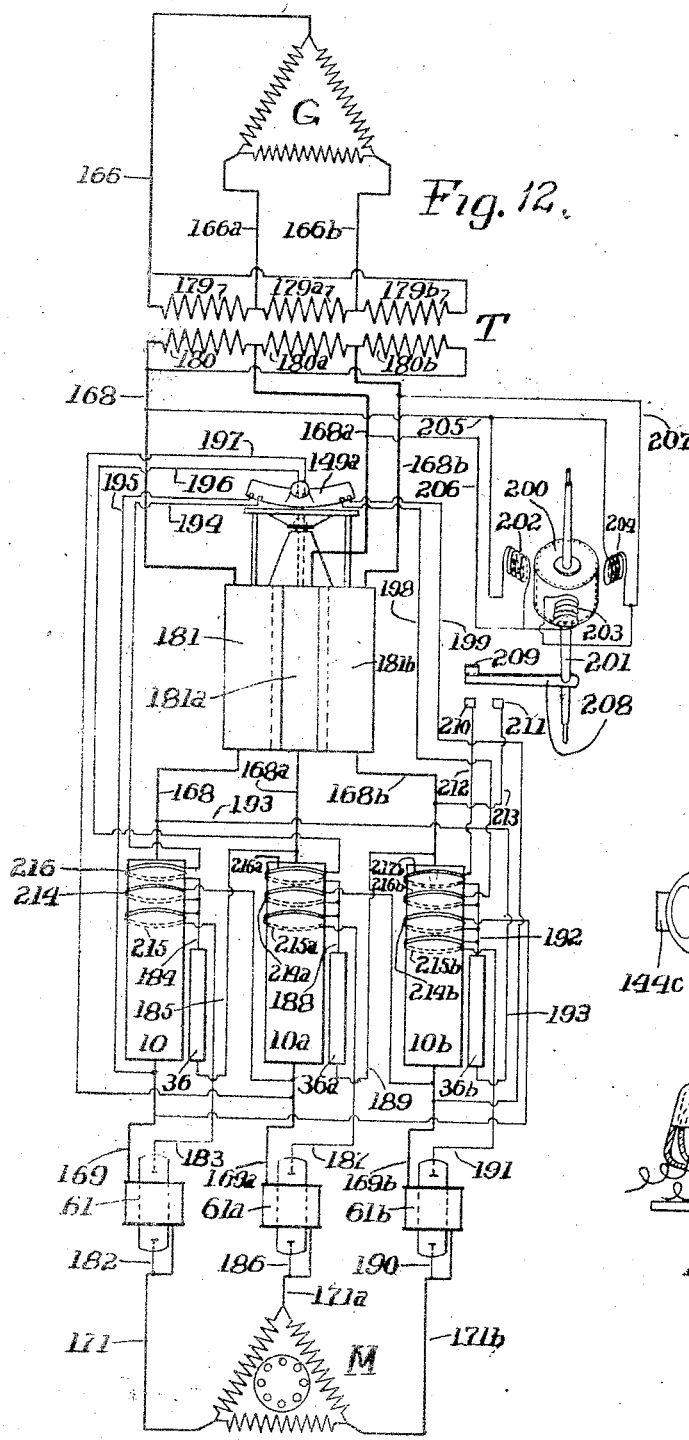
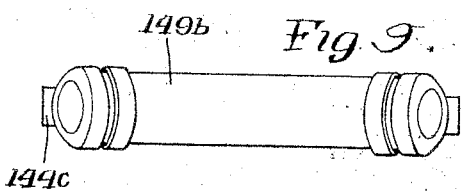
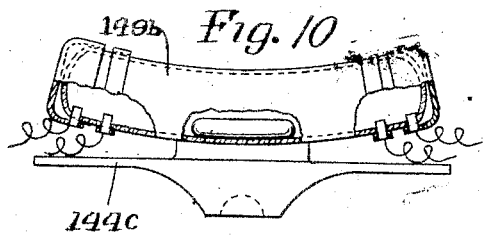
Inventor
Lloyd E. King.
By Albert C. Bell
Attorney.

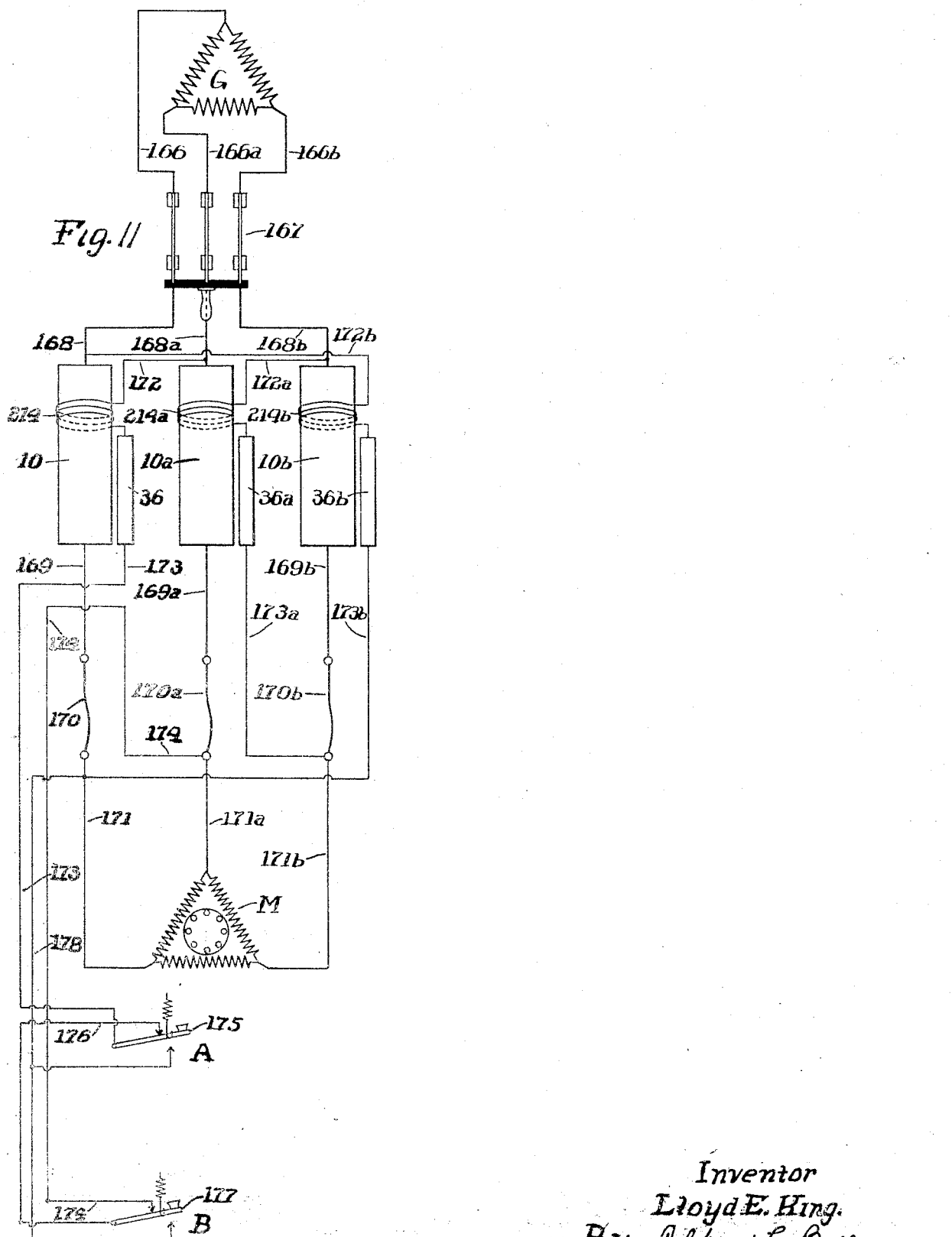

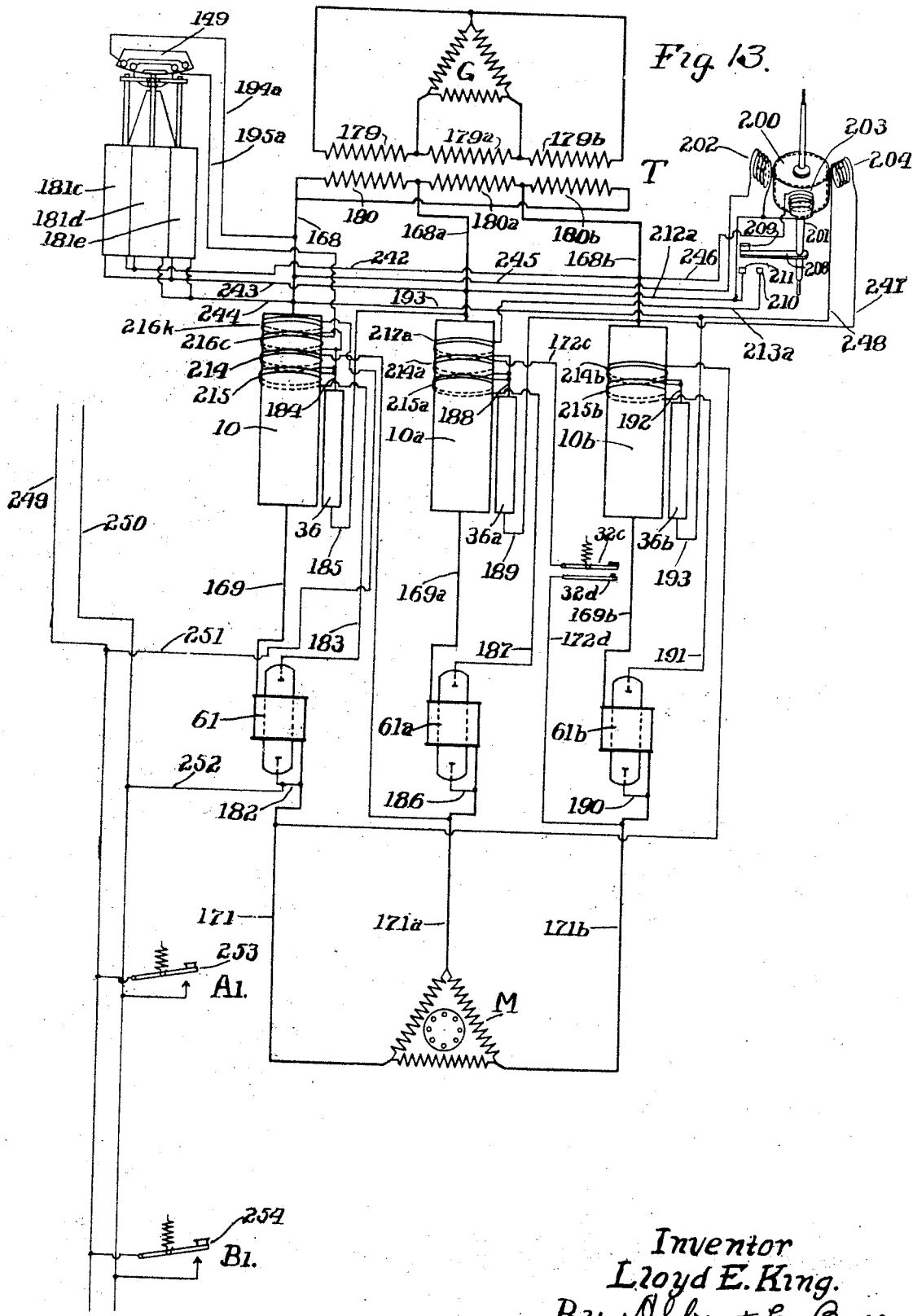

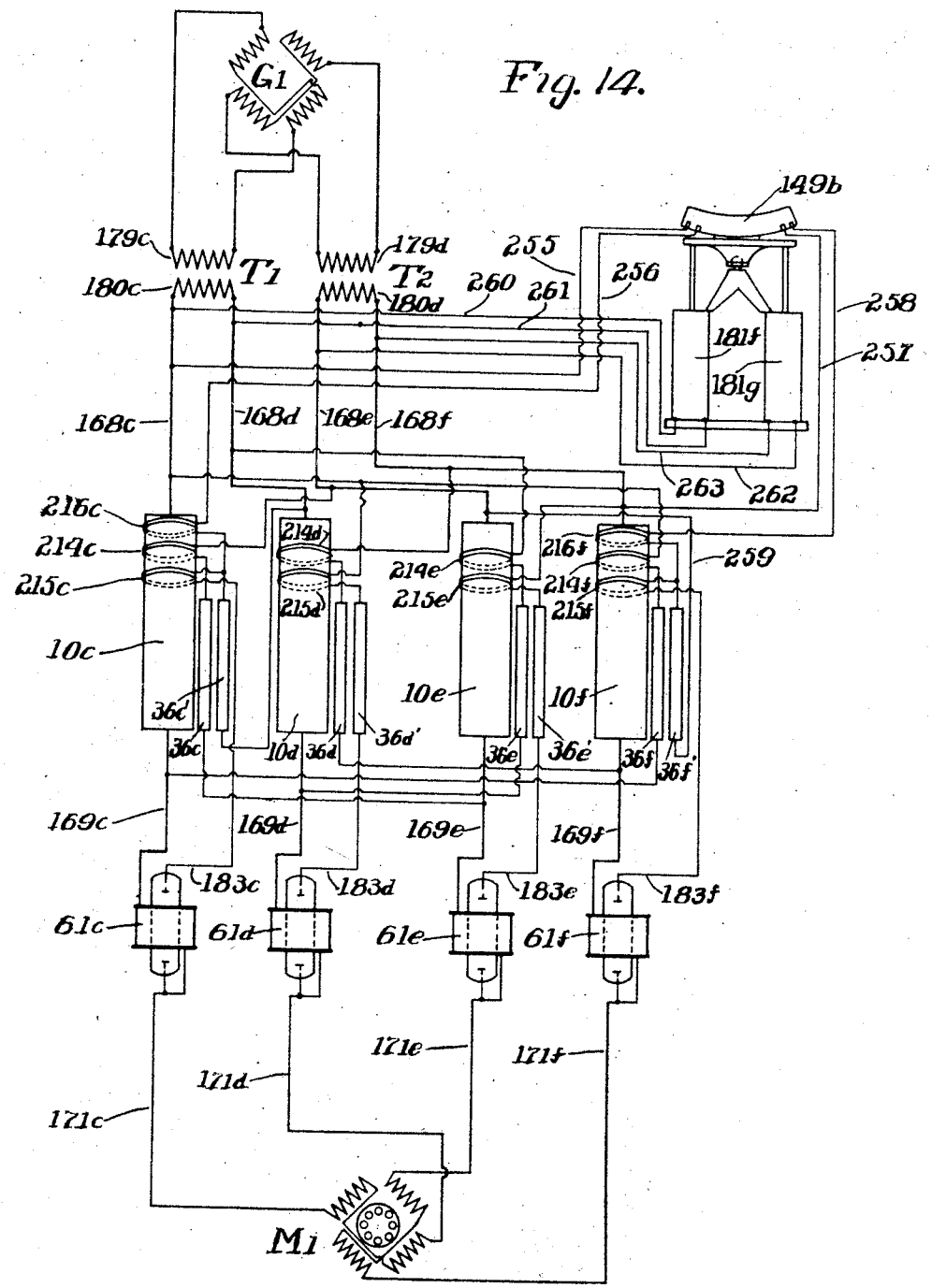

Patented Feb. 10, 1931

1,792,310

UNITED STATES PATENT OFFICE

LLOYD E. KING, OF BERWYN, ILLINOIS

ELECTRIC PROTECTIVE SYSTEM AND APPARATUS THEREFOR

Application filed July 23, 1923. Serial No. 653,200.

My invention relates to a system for protecting electric circuits generally, whether alternating or direct current and the apparatus connected therewith, from overload, from abnormally high voltage, from abnormally low voltage, and where the system is a multi-conductor system, from unbalanced voltage and current conditions depending upon the requirements of any particular case. By my invention I also provide a system of protection for alternating current circuits for protecting the circuits and apparatus connected therewith from phase reversal, and where the system is a polyphase system, from unbalanced phase relation and from single phasing.

In carrying out my invention I prefer to employ circuit breakers of the type consisting of a separate circuit breaker for each conductor of the circuit protected by my system, although in the broader aspect of my invention any type of circuit breaker may be employed. Generically, in carrying out my invention the circuit breaker mechanism is provided with one or more tripping coils, depending upon the abnormal conditions to be guarded against, for example if the system is to be protected only from overload, but one tripping coil is required for each circuit breaking mechanism; again if the system is to be protected from overload and from unbalanced voltage conditions an additional tripping coil is provided on the circuit breaker mechanism; again, if the system is to be protected against overload, against unbalanced voltage conditions and against abnormally high or abnormally low voltage conditions, a second additional tripping coil is provided in connection with the circuit breaking mechanism. Generally speaking the circuit breaking mechanism is provided with a tripping coil for each particular condition against which protection is to be secured, in addition to the tripping coils for securing overload protection.

More specifically, particularly where a unit circuit breaker construction is provided in each conductor of the system to be protected, a first tripping coil is provided in connection with each circuit breaker mechanism, energized by the opening of another one of the conductors of the system in one way or another due to overload conditions, the opening of the first circuit breaker by opening a second conductor of the system causes the energization of a tripping coil on a circuit breaker in another of the conductors of the system and so on, the relation of the tripping coils of the several circuit breakers to the gaps in the conductors opened by the overload condition, being in a closed series relation, that is to say a gap in a first conductor of the series operates a second breaker producing a gap in a second conductor, the gap in the second conductor operates the circuit breaker in a third conductor producing a gap in it and so on depending upon the number of circuits protected and finally a gap in the last conductor trips the circuit breaker in the first conductor, thus causing operation of all of the circuit breakers one after another and resulting in completely disconnecting the protected lines and connected apparatus from the supply line. In carrying out my protective system the initial gap or gaps referred to, in a conductor or conductors of the protective system may result from the blowing of a fuse or fuses in the conductors of the protected circuit, or the operation of fuse substitutes in one way or another. By my invention I provide a type of fuse substitute adapted among other uses, to the actuating of electric contacts when an abnormal current flows through the energizing element of the overload device; the contacts controlled by the overload device, by their operation under overload conditions, control the operation of a tripping coil on one of the unit circuit breakers connected in a desired one of the conductors of the system to control its continuity, thus tripping the said circuit breaker and producing a gap in the corresponding conductor at that point; a gap produced in the first conductor operates a tripping coil on the next circuit breaker in the series and, in the manner above described, causes the operation of all of the circuit breakers of the protective system, one after another, to entirely disconnect the protected circuit from the line wires. In using overload devices in place of fuses it will be understood that an overload device is connected with each conductor of the system to be protected thereby.

The abnormally high voltage and abnormally low voltage protection referred to may be secured by the use of protective devices similar to the overload devices above mentioned, the particular difference being the adjustment of the electric contacts controlled by the protective device so that the tripping circuit controlled by the protective device is actuated either when an abnormally high voltage or an abnormally low voltage is impressed upon the energizing winding of the protective device as the case may be, it being understood that said protective device has its energizing winding connected with the points of the circuit, between which the difference of potential is to be maintained by the device, within desired limits, and that as many of the protective devices may be employed as there are voltages in the system to be maintained within desired limits, whether said limits are the same or different for the several voltages. It will also be understood that the tripping circuit controlled by each protective device under these conditions, actuates one of the unit circuit breakers to open one of the conductors involved in the abnormal voltage conditions; also that where the circuit breakers are in addition connected for overload protection in the manner above described, they are actuated one after another, to separate the protected line and connected apparatus from the supply wires; it will also be understood that the circuit breaker actuated by the operation of the abnormal voltage protective device, may be employed to open any desired circuit of the protected apparatus. In a manner similar to that described, my system is adapted for protecting a system of conductors and apparatus from abnormally low current flow in the system by providing the protective device with an energizing winding suitable for connection in series with a conductor of the protected system and arranging the contacts of the protective device so that they are actuated to control a tripping circuit of a circuit breaker, when the current flowing through the conductor and energizing winding is lower than a predetermined amount. In this case a protective device is employed preferably in each conductor of the protected system, connecting the system with the line conductors, and the tripping coils of the circuit breakers are connected as above described in connection with the voltage protection system.

In some cases it is important in a multiconductor system, that the voltage between one pair of conductors shall be the same as the voltage between another pair of conductors, and so on throughout the system, to secure proper operation of the apparatus of the system. For systems of this kind, I provide a protection against unbalanced voltage conditions by means of a circuit controlling mechanism having a plurality of energizing windings, one for each of the voltage conditions to be maintained in balanced relation, said windings being arranged to produce effects opposing each other, so that the resultant effect of all of said energizing windings upon a contact controlling mechanism is zero or substantially so, when a condition of balanced voltages exists, for which condition the contact actuating mechanism does not operate. When, however, the voltages become unbalanced, the contact actuating mechanism is operated by the unbalanced action of the energizing coils, and a tripping coil on one of the circuit breakers of the system is actuated by the contacts of the protective device, to release the circuit breaker, and thus in the manner above described actuate all of the circuit breakers of the system, one after another, assuming that the system is provided with overload protection of the kind above described. Similarly, in connection with some electric systems, it is desirable to maintain equal current flow in several conductors of the system to be protected, and to insure this I provide a protective device similar to the unbalanced voltage device, the difference being that the energizing windings are proportioned to be connected in series with the conductors of the system in which the currents flowing are to be maintained substantially equal, instead of between the conductors of the system, as in the case of the unbalanced voltage device.

In connection with alternating current working, and particularly in connection with polyphase electric systems, a condition frequently arises which is dangerous to the apparatus and against which it is desirable to provide adequate protection. This is where the polyphase circuit is used to operate polyphase apparatus having windings in inductive relation to each other, a part of the windings or conductors being connected with each phase. With such a system, where for any reason a fuse or equivalent overload device in one conductor is blown or opened, it frequnetly occurs that the protective devices in the other conductors do not operate, and, for example with a three phase system, although the conductor of one of the phases is interrupted and as to that phase there is phase failure, the remaining conductors are operative to supply current to the polyphase apparatus, and on account of the inductive relation of the windings or conductors, a distorted operation of the apparatus continues, which is commonly known as single phasing. In many cases this distorted operation is dangerous to the apparatus and to protect the apparatus in this case, all of the supply circuits of the system must be disconnected in a positive and reliable manner from the line conductors, when any one of the overload devices is operated to disconnect the corresponding conductor from the line wire. It will be observed that my system of protection, consisting of circuit breakers and tripping coils connected as referred to above, affords an ideal protection against this danger, since as above described, the forming of a gap or break in any supply conductor leading to the protected apparatus, results in operating the circuit breakers one after another until all of the supply circuits leading to said apparatus are opened. It will further be observed that where a polyphase system is to be protected and transformers are used between the generator and the protected circuit, a single phasing condition may occur on the generator side of the transformers that will not be manifested as a single phasing condition on the secondary side of the transformers, and yet that the danger to the protected system may be great as a result of the resulting unbalanced and distorted voltage and current conditions in the protected apparatus. To protect against this condition, the unbalanced voltage or unbalanced current devices above described may be employed to advantage to disconnect the protected system from the line wires. Again, an unbalanced voltage or current condition may be produced locally between the circuits of the system from a variety of causes, for example loose connections, resulting in a dangerous condition of operation and the unbalanced voltage and unbalanced current devices provide protection against these conditions. A further feature of protection afforded by my system, is protection for alternating current circuits against phase reversal, which is accomplished by the provision of a device having a tendency to rotate in one direction for proper phase relationship of the several phases, said device having a tendency to rotate in the opposite direction, if one of the phases of alternating current is reversed. The energizing windings of the device are connected with the system to be protected and the reversal of the tendency to rotate, is made use of to control electric contacts employed to actuate a tripping coil on one of the circuit breakers of the system, the opening of said circuit breaker preferably operating in the manner above described to effect the opening of the remaining circuit breakers, one after another, to open all of the supply circuits to the protected apparatus.

Instances requiring protection from overload are well known, and the need for this protection may result in any case where a motor depends upon a counter electromotive force factor to protect its windings from abnormal flow, and is slowed down by the application of too great a load; other common instances requiring overload protection are where the windings of the operated apparatus are either partially or wholly short circuited in any manner. Low voltage protection is desirable in any case where starting devices are required in connection with the operated apparatus to gradually bring it into operative condition; for with apparatus of this kind, if the voltage on the supply conductors for any reason becomes abnormally low or is reduced to zero, and subsequently full voltage is supplied to the supply conductors from the source of supply, the operated apparatus is not in condition to withstand the abnormal rush of current. The same is true in connection with protection from low current or no current. This species of protection is also important in elevator systems, where the voltage impressed upon the elevator motor is effective in holding the brake of the motor in released condition, since the voltage generated by the motor itself, with the motor cut off from the line, may readily be sufficient to operate the brake releasing mechanism and produce damage, particularly where the motor is driven at abnormally high speeds by the descending elevator, as sometimes occurs under these conditions. Protection against unbalanced voltage is desirable in any case where operated apparatus is supplied with current from a multiconductor circuit, for example in a three wire direct current system with distribution circuits operating electrical apparatus through two separate circuits from the supply conductors and also other apparatus through a single circuit from the neutral conductor and one of the outside conductors of the supply circuit; also in connection with any operated apparatus, where a plurality of circuits in an actuated device, particularly an alternating current motor, operate simultaneously and necessarily in balanced relation, to produce the contemplated operation of the apparatus. This species of protection is particularly indicated, where the apparatus is designed for operation on constant voltage. Unbalanced current protection is desirable where the operated apparatus is supplied with current from a multiconductor supply circuit where the apparatus is designed to operate with equal currents flowing through its several circuits, whether the current flow is alternating or direct.

In connection with alternating current working, protection against single phasing is important where the operated apparatus is designed for simultaneous operation by currents of different phases and where for one reason or another there may be a failure of one of the phases, resulting in unbalanced operation of the apparatus through the remaining phase or phases, whether by inductive action the winding corresponding with the phase that has failed, are operative or not. Unbalanced voltage and unbalanced current protection are desirable in alternating current working under the conditions indicated generally above and also where the unbalanced voltage or current conditions may result from primary phase failure in systems employing transformers, particularly where the primary phase failure may result in an unbalanced condition not strictly that of phase failure in the secondary circuits. Phase reversal protection is desirable generally in alternating current working with a polyphase system, to protect the operated apparatus from conditions that would result from the improper connecting of the line or supply wires of the system in the event of the supply wires being broken by storms or any other reason.

In carrying out my system of protection, I prefer to use a circuit breaker construction of the single pole type, each provided with its own tripping mechanism and my present invention includes a construction of this kind in which provision is made for blowing out the arc due to the opening of the breaker contacts and I also preferably provide auxiliary devices for maintaining the tripping coil circuit in closed condition until after the main breaker circuits are opened, which then operate to open the tripping coil circuit. By my construction I further provide a circuit breaker unit capable of as ready insertion in and removal from the circuit, as the modern well known enclosed fuses; furthermore its construction is relatively simple, facilitating the use of spare circuit breakers, so that the circuit breakers may readily be removed and replaced by the spare circuit breakers without interrupting the service, to the end that the circuit breakers may be frequently inspected and kept in perfect working condition.

By my invention I also provide an improved form of fuse substitute by which electric contacts may be closed by the effect of abnormal current flow, these devices having the advantage of reliability of operation and adjustability, to insure the operation of the device at precisely the desired degree of abnormal current flow. These devices further have the advantage over fuses, that they may be repeatedly used without renewal and thus insure reliability of operation even though repeatedly used, and that they completely eliminate all devices requiring renewal, all connections being of a permanent nature. As illustrated below in connection with the drawings, these devices may be operated either by the electromagnetic effect of the current or by the heating effect thereof, as desired.

By my present invention I also provide devices responsive to abnormally high or abnormally low current or voltage, in which contacts are provided to be closed when the current or voltage applied to the device reaches a predetermined maximum or minimum value, the devices being constructed so that the limiting values for which the device will operate may be adjusted and fixed within any desired limits. For example, the high voltage or current protection secured by the device may either be substantially the same as secured by the overload device above referred to, or if desired in any particular case, the high voltage or current effective in operating the device may be within the values commonly recognized as proper ones for overload protection. Similarly, the low current or voltage protection secured by these devices may be either of a desired margin, however great, below normal voltage or current for any particular case, or sufficiently low so as to get protection of this kind only on conditions of substantially no voltage or current.

By my present invention I also provide an improved device for responding to unbalanced voltage conditions, in which the several voltages of the system operate upon the device to normally produce balanced effects upon the operated parts of the device when the voltages are in balanced relation, and to produce unbalanced effects upon the operated parts when the voltages of the system are unbalanced for any reason, with the result that for any condition of unbalanced effect upon the operated parts they are operated and close or open as the case may be, a control circuit actuating the circuit breaker mechanism. By my invention I also provide an improved mechanism similar to the unbalanced voltage controlling mechanism for responding to unbalanced current conditions, the operation of which is in a general way similar to the operation of the unbalanced voltage mechanism and which for any condition of unbalanced currents impressed upon the mechanism actuates the operated devices of the mechanism to either close or open a control circuit as the case may be, to actuate the circuit breaker mechanism. By my invention I also provide an improved means for controlling a circuit breaker tripping coil circuit, upon reversal of any one of the phases of a polyphase system by which currents from the several phases actuate the device in a manner to maintain the operated parts of the mechanism in a condition either opening or closing as the case may be, the control circuit extending to the circuit breaking mechanism, depending upon whether the control circuit is normally closed or normally open and requires an opening of the circuit or a closing of the circuit to actuate the circuit breaking mechanism. With this device, if the action of the current from one of the phases is reversed, the operated parts are moved in a direction to render the control circuit effective to actuate the circuit breaker mechanism.

My invention therefore contemplates the use of circuit breaker mechanism, preferably of the unit type, in each conductor of the system to be protected, that must be opened to afford protection of the kind desired to the system, said circuit breaker mechanism being of a type permitting the use of a plurality of tripping coils, the actuation of any one of which will operate the circuit breaker; also the interrelating of a series of said tripping coils, one for each conductor to be opened in protecting the system and connected so that each is associated with one of said conductors and is actuated by forming a break or gap in another of said conductors, whether said break or gap results from the blowing of a fuse in the latter conductor, or the operation of a circuit breaker connected in circuit with said latter conductor, and whether the operation of said circuit breaker actuates said tripping coil circuit solely as a result of its connection to the terminals of said break or gap, or, on the other hand said actuation results from some other species of electrical or mechanical control of said tripping coil circuit by said circuit breaker, this arrangement resulting in actuating the series of tripping coils, one after another, when a break or gap is formed as and with the results stated, in any of the conductors of the system protected by said series of tripping coils; also the use of protective devices affording protection of various kinds to the system and at least one circuit breaker tripping coil for actuation by each specific protective device, whether said tripping coil is also used for another protective purpose or provided solely for affording specific protection resulting from the operation of said specific protective device; also the use as a part of the protective system, of a circuit breaker tripping coil, whether used for another protective purpose or solely for this specific purpose, for actuation by manual means from any desired point or points, whether near the protected system or remote from it; also that the function of each specific protective device is to actuate a control circuit extending to a corresponding tripping coil of the circuit breaker mechanism, said actuation preferably resulting from closing said control circuit or impressing a suitable voltage upon it, although I consider control circuits for the purpose mentioned, which are of the normally closed or energized type and are opened to actuate the connected apparatus to be the equivalent of normally open or unenergized control circuits; also that the said protective devices may be actuated by current or voltage conditions in a first set of conductors and operate circuit breaker mechanism controlling the same or another set of conductors, as desired; also that said tripping coils may be supplied with actuating current from a first set of conductors and operate circuit breaker mechanism controlling the same or another set of conductors, as desired; also that my system of protective devices may be applied to any desired type of direct current system and to any desired type of alternating current system, however many phases may be involved; and that in any case as much or as little of my complete protective system and apparatus may be employed, as desired in that particular case.

Figure 4:
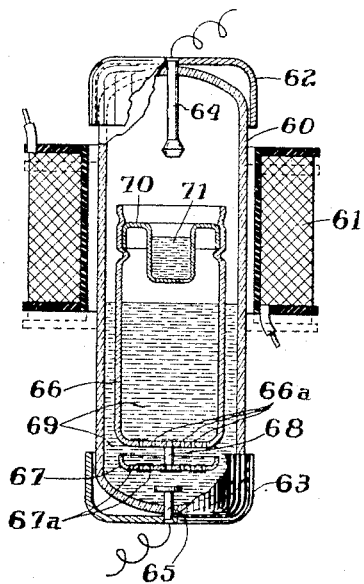
Figure 8:
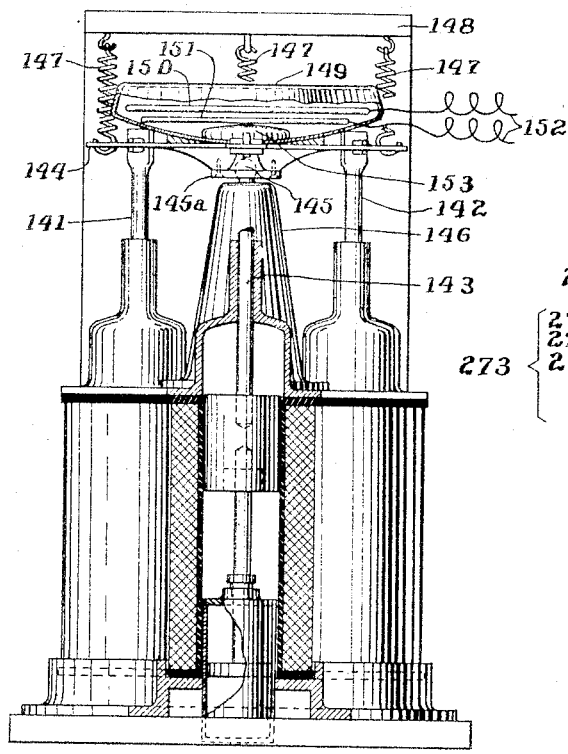
Figure 17:
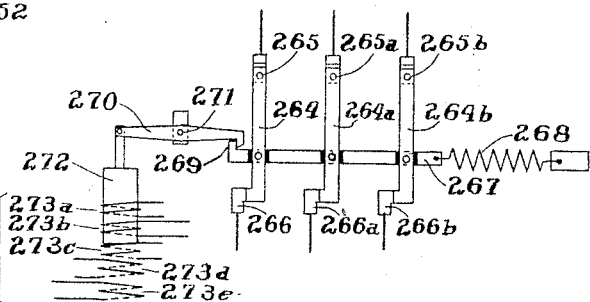
Figure 18:
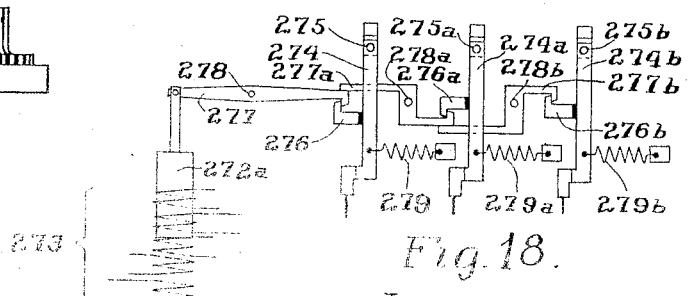
Figure 5:
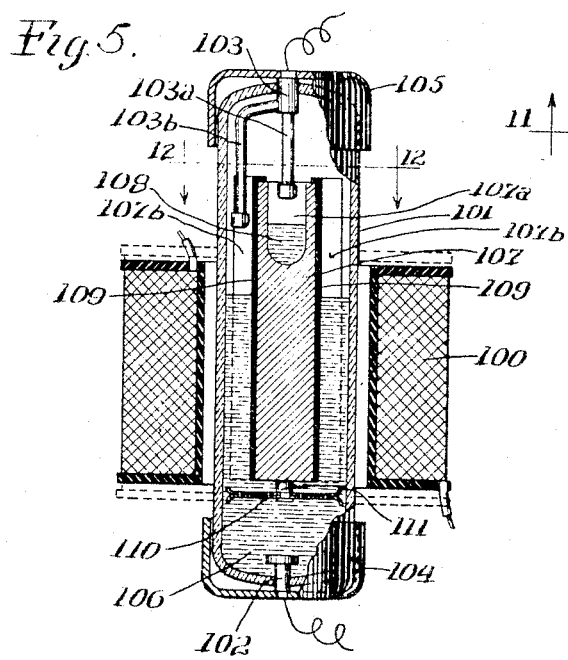
Figure 6:
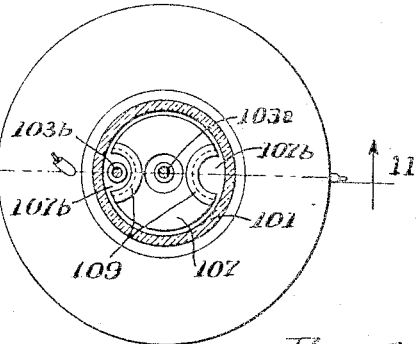
Figure 15:
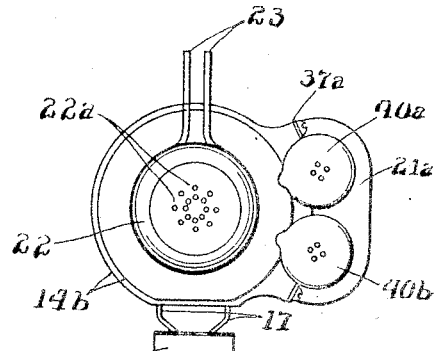
Figure 16:
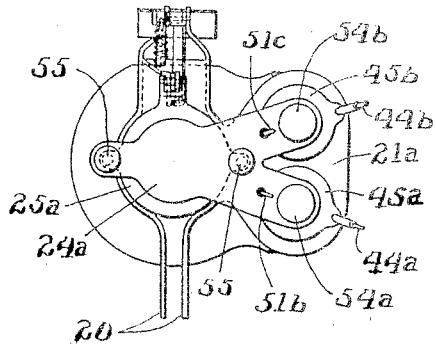

My invention will best be understood by reference to the accompanying drawings showing preferred embodiments thereof, in which Fig. 1 shows in vertical, longitudinal, sectional view my improved circuit breaking mechanism, this view being taken along the line 1—1 in Fig. 2, Fig. 2 is a plan view of my improved circuit breaking mechanism, Fig. 3 is a side elevation of my circuit breaking mechanism in its released condition, Fig. 4 is a vertical, sectional view of my improved overload mechanism, Fig. 5 shows in a view similar to Fig. 4, a construction of control mechanism for actuating a control circuit at a predetermined high or predetermined low voltage or current impressed upon the mechanism, Fig. 6 is a sectional view of the parts shown in Fig. 5 taken along the line 12—12, Fig. 7 is a top view of a mechanism for actuating a control circuit, for unbalanced conditions of voltages between or currents in the conductors of a multiconductor system, Fig. 8 shows in front elevation and partially in section, the mechanism shown in Fig. 7, Fig. 9 is a plan view of a modified construction of a mercury contact mechanism for use with actuating mechanism of the type shown in Figs. 7 and 8, with the exception that this construction is for use with two circuits, Fig. 10 shows in front elevation the parts shown in Fig. 9, Fig. 11 is a diagrammatic view of a polyphase alternating current system equipped with overload fuses and my unit circuit breaker construction, Fig. 12 is a diagrammatic view of a polyphase electric system provided with overload devices of the kind shown in Fig. 4 for operating unit circuit breakers of my construction, provided also with the unbalanced current mechanism shown in Figs. 7 and 8, and provided also with phase reversal protective mechanism, Fig. 13 shows in a view similar to Fig. 12 a similar electric system provided with similar protecting devices, with the exception that in this case the system is provided with an unbalanced voltage protecting device, instead of an unbalanced current protecting device as shown in Fig. 12, Fig. 14 shows in a view similar to Fig. 13 a similar electric system for two phase operation, instead of three phase operation as shown in Fig. 13, Fig. 15 shows in a view similar to Fig. 2, a modified form of circuit breaker mechanism using a plurality of tripping coil circuit breaking mechanisms instead of but one of the latter mechanisms as shown in Figs. 1 and 2, Fig. 16 is a bottom view of the construction shown in Fig. 15, Fig. 17 is a diagrammatic view illustrating the manner in which a multipole circuit breaker may be used with my improved system, said circuit breaker having common operating mechanism and a single releasing device which may be provided with a plurality of tripping coils, and Fig. 18 is a diagrammatic view illustrating a modified circuit breaker mechanism that may be used with my improved system, in which said mechanism comprises unit circuit breakers and interlocking releasing devices actuated by a single tripping device that may be provided with a plurality of tripping coils.

Similar numerals refer to similar parts throughout the several views.

As shown in Figs. 1–3 inclusive my unit circuit breaker construction consists of a tube 10 of insulating material in which a metal plunger 11 is mounted to move longitudinally. The tube 10 carries at one end an outer metallic sleeve 12 having its outer end inturned to form a main contact or contacts 12a of the device, engaged by the plunger 11 in its set position. The inner end of the contact 12a carries a ring 13 of refractory conducting material, for example carbon, extending beyond the end of the contact, so that the break in the circuit, when the plunger 11 is withdrawn from the contact, is between the end of the plunger and the ring 13. The end of the plunger as indicated at 11a is chamfered somewhat, so that the principal arcing that occurs will be between the extreme end of the plunger and the ring 13, and thus the pitting that would otherwise occur on the main contact surface of the plunger, is restricted to the end portion and does not roughen the contact portion of the plunger.

The sleeve 12 has mounted thereon and insulated therefrom a tripping coil 14 with its outer end nearly in the plane of the end of the tube 10 which is adjacent the arcing plane of the ring 13. The tripping coil 14 may consist of one or more sections, each capable of releasing the circuit breaker mechanism, as will be described below. The coil 14 is provided with heads 14a of magnetic material, for example soft iron, to act upon the armature 15, also of magnetic material, in a manner to be described. The other end of the tube 10 has mounted therein a metal sleeve 16 in sliding contact with the plunger 11 to constitute the other main contact of the device. The sleeve 16 is provided with an outer end flange which is extended to form a bracket 17 serving as a support for the pivot 18 of the arm 19 carrying the armature 15, serving also by its rearward extension to form a connecting and mounting clip or clips 20, as more clearly shown in Fig. 3, and also serving to in part support, by means of an annular flange 21 carried thereby, an auxiliary breaker to be described. The sleeve 12 carries on its outer end a second metal sleeve 22 closed at its outer end and perforated as indicated at 22a and having a lateral extension or extensions 23 to form a connecting and mounting clip or clips for the device. The clips 20 and 23 by their electrical connection with the contacts 16 and 12a respectively, constitute the main connections of the circuit breaker to the circuit to be protected thereby, and these clips may engage suitable bolts or jaws connected with the conductors forming part of the protected circuit, as a result of which the device as a whole may be readily connected in the circuit and readily removed therefrom as may be necessary or desirable. These clips may have any convenient form and construction, the only desiderata being that they shall make good contact with the terminals of the protected circuit and be capable of ready connection therewith and ready disconnection therefrom.

The plunger 11 has rigidly connected with its lower end, a laterally extending arm 24, preferably of metal, and between the said arm and the outer end of the contact sleeve 16, the plunger carries a metal sleeve 25 provided at its outer end with a flange 25a engaging one end of a spring 26, the other end of which rests against the flanged outer end of the contact sleeve 16. The flanged end 25a is extended on one side of the plunger, to form a support for a pivotal connection 27 engaging one end of a first link 28, which is pivotally connected at its other end, as indicated at 29, with one end of a second link 30, the other end of which is pivotally connected at 31 with a downwardly projecting arm 32 carried by the bracket 17. For the closed position of the circuit breaker shown in Fig. 1, the plunger 11 is in engagement with the contact 12a, the spring 26 is compressed, and the links 28 and 30 occupy a position preventing the spring from moving the plunger out of the contact 12a, since the line of pull through the pivotal connections 27 and 29 is slightly to the right, for the position of the parts shown in Fig. 1, of the pivotal connection 31. The links 28 and 30 are prevented from moving around to the right, for the position of the parts shown in Fig. 1, by a suitable stop, which, as shown, may conveniently consist of an ear 32a bent from the edge portion of the arm 32. The arm 19 is extended beyond its pivotal support 18, and the said extension carries an arm 33 having a bent end or hook 33a, nearly or quite in engagement with the upper end portions of the links 28 and 30 for the position of the parts shown in Fig. 1. The arm 19 and the armature 15 are held in the position indicated in Fig. 1, by a spring 34 between the lower extension of the arm 19 and the arm 32, and outward motion of the armature 15 away from the tripping coil, is limited by a stop 35 carried by the lower end of the extension of the arm 19, which rests against the edge of the arm 32.

As a result of the construction thus far described, when the armature 15 is drawn towards the magnetic heads 14a of the tripping coil, by energization of the coil, the bent end 33a of the arm 33, moves the upper ends of the links 28 and 30 to the left sufficiently to move the line of pull on the link 28, through the pivotal connections 27 and 29, to the left of the pivotal connection 31, thus releasing the locking condition of the links and permitting expansion of the spring 26 to move the sleeve 25, and therefore the plunger 11, downwardly to the position indicated in Fig. 3. This movement, it will be understood, takes place very quickly and produces a quick break in the circuit between the lower inner edge of the ring 13 and the extreme upper edge of the chamfered portion 11a of the plunger 11, thus reducing arcing to a minimum. Any arcing that occurs at this time is further reduced, or entirely suppressed, by the magnetic action of the tripping coil 14, which is effective as a magnetic blow-out, due to its relation to the breaking or arcing point of the mechanism. The circuit through the tripping coil is maintained during the separation of the end of the plunger from the ring 13, to secure the magnetic blow-out effect referred to, and the circuit of the tripping coil is subsequently broken by means of the following construction. A second tube of insulating material 36 is supported at its lower end, for the position of the parts shown in Fig. 1, by the annular flange 21 and at its upper end by a clip 37 secured to the lower head 14a of the tripping coil. The tube 36 contains therein a freely movable metal rod 38 engaging a tubular contact 39 at its upper end when the rod 38 is in the position shown in Fig. 1. The contact 39 is of the same general construction as the contact 12a and is rigidly supported by the upper end of the tube 36. The upper end of the tube 36 is also provided with a cap 40, preferably of insulating material, to protect the parts. The end wall of the cap 40 is preferably perforated and a perforated disc 41 is shown between the cap and the outer end of the contact 39, to prevent the projection outwardly from the auxiliary breaker, of any flames or burning gases that may be produced by it. The sleeve 22 also holds between its end and the end of the contact 12a, a similar perforated disc 42 for securing the same result with the main breaker. The upper end of the rod 38 is preferably chamfered for the same reason described above for the chamfered portion 11a of the plunger 11. The tube 36 carries a second contact 43 at its lower end, which is in sliding engagement with the rod 38. Provision is made on the contact 43 for connecting the same by a wire 44 with a tripping circuit, and the lower end of the contact 43 and the said connection are preferably enclosed by a protecting cap 45 of insulating material. The upper contact 39 of the auxiliary breaker is connected by a wire 46 with one terminal of the tripping coil 14, and the other terminal of the tripping coil is connected with a wire 47 to form the other connection with the tripping circuit.

The rod 38 has rigidly secured to its lower end a rod 48 of insulating material provided near its upper end with an arm 49 engaging one end of a spring 50, the other end of which is connected with a rod 51 having a bent lower end 51a, said rod 51 extending loosely through an aperture provided therefor in the arm 24. The rod 48 is rigidly secured at its lower end to a metal rod 52 provided at its upper end with a flange 53 and at its lower end with a flange 54, said rod 52 extending with a sliding fit through a suitable aperture therefor in the outer end of the arm 24.

As a result of the construction described, operation of the auxiliary breaker is effected as follows: When the spring 26 moves the plunger 11 from the upper contact 12a, the arm 24 moves freely on the rods 51 and 52 and at this time the spring 50 is under no tension. After the upper end of the plunger 11 has left the ring 13, or at about the time it leaves the ring 13, the bent end 51a of the rod 51 is engaged by the arm 24 and further movement outwardly of the arm 24 places the spring 50 under tension which condition continues until the arm 24 engages the flange 24. The engagement of the arm 24 with the flange 54, as a result of the arm 24 being in rapid motion at the time, produces a hammer blow effect on the rod 52 and therefore on the rod 38, to start the rod 38 in motion downwardly against the friction of the contacts engaging it, and when the rod 38 leaves the contact 39, the spring 50 operates to move the rod 38 rapidly from the end of the contact 39, thus quickly breaking the circuit of the tripping coil, the current flowing in which may be made relatively small in any event by properly proportioning the windings. The flange 53 prevents the rod 38 from being drawn too far from the tube 36 and also serves to move the rod 38 back to the position shown in Fig. 1 when the arm 24 is raised to close the contacts of the main circuit breaker, thus insuring the closure of the contacts of the auxiliary breaker, every time that the contacts of the main breaker are closed.

It will be noted that for the closed condition of the contacts of the circuit breaker, the flanged end 25a of the sleeve 25 is somewhat above the upper surface of the arm 24, the amount of this separation being determined by a headed stud or studs 55 extending through a clearance opening or openings therefor in the arm 24 and secured to the flanged head 25a of the sleeve 25. The stud or studs 55 thus serve to prevent undue separation between the arm 24 and sleeve 25 and the separation referred to provides that the sleeve 25 shall impart a hammer blow to the arm 24 when the main circuit breaker is released and thus effect a positive beginning of the movement of the plunger 11 in the contact 12a against its frictional engagement with said plunger.

The arm 32 is shown as extended downwardly to form a bracket 32b supporting normally separated, insulated contacts 32c and 32d, which are brought into engagement by the arm 25a for the open position of the circuit breaker, for a purpose to be described.

After the tripping coil has been actuated and the parts have moved to the position indicated in Fig. 3, opening both the main circuit and the tripping coil circuit, the circuit breaker may readily be reset, or moved to the position shown in Fig. 1, by raising the arm 24 and moving the pivotal connection 29 outwardly and around to the right relatively to the pivot connection 31, until the ends of the links 28 and 30 adjacent the pivotal connection 29, rest against the stop 32a in close proximity to the bent end 33a of the arm 33.

In carrying out my invention, I find it desirable in many cases to provide a plurality of windings in the tripping coil of the circuit breaker construction above described, for use as hereinafter described. In certain of these cases, as hereinafter illustrated, I find that a single auxiliary breaker may be employed in a common conductor forming a part of the circuits of all of said windings, in which cases, the circuit breaker construction shown in Fig. 1 may be employed. In other connections, also hereinafter illustrated, I find it desirable to provide circuits for said windings, that are electrically distinct and separate from each other. For the uses last referred to, I modify the construction of circuit breaker as shown in Figs. 15 and 16, to provide an auxiliary breaker for each of said separate circuits. In this construction, one of the magnetic heads of the tripping coil, as shown at 14b, is extended to support by a clip 37a, two auxiliary breakers having caps 40a, 40b, said auxiliary breakers being supported at their other ends by a flange 21a, similar to the flange 21, and provided at said other ends with caps 45a, 45b. The windings are provided with terminal wires in the same manner shown in connection with Fig. 1, one terminal wire for each auxiliary breaker being shown at 44a, 44b. This modified construction is provided with an arm 24a for engaging spring ends 51b, 51c and flanges 54a, 54b for the two auxiliary breakers respectively, in the same manner that the arm 24 engages the spring end 51a and the flange 54 in the construction of Fig. 1. Each auxiliary breaker is of the same construction and operates in the same manner as shown and described in connection with Fig. 1 and the construction and operation of the main breaker is the same as described above in connection with Fig. 1. The relation of the arm 24a to the auxiliary breakers is the same as described above for the construction shown in Fig. 1 and insures the closing of both auxiliary breakers each time that the main breaker is closed. In the same manner, the circuit breaker mechanism may be provided with any desired number of auxiliary breakers to meet the requirements of any particular case.

In carrying out my invention I find it desirable to use fuse substitutes instead of fuse links of any kind as overload protection devices, for the reason that they may be repeatedly used, and they may be held accurately set for any desired load current, it being understood that these devices constitute broadly, control means for opening a circuit when the current flowing therein reaches a determined amount. I illustrate different types of these devices in Figs. 4–6 inclusive of the drawings.

As shown in Fig. 4, my overload device consists of a tube 60 surrounded by an actuating coil 61 in which the tube may be moved axially to secure desired adjustment of the device, as indicated in dotted lines showing a position of the coil 61 relatively to the tube 60, differing from that shown in full lines. The tube 60 is preferably provided with end caps 62 and 63 for protecting the tube and retaining it in the coil 61, and has extending through its ends, terminals 64 and 65 for inclusion in a control circuit extending from the device. The tube 60 is of insulating material, preferably glass, and within it, there is disposed a tubular core 66 of magnetic material, for example iron, provided in its lower end with perforations 66a and carrying immediately below its lower end a disc 67, also perforated as indicated at 67a and secured to the lower end of the tube 66 and in spaced relation therefrom by a stud 68. The tube 60 contains a liquid conductor, for example mercury, as indicated at 69 of sufficient amount so that the tube 66 floats therein with its upper end within the lower portion of the coil 61. The upper end of the tube 66 carries a cup 70 containing liquid conductor, for example mercury, as indicated at 71, in a position below the contact 64 for all conditions of normal current flow through the coil 61. The operation of the device just described is as follows, assuming the relation of the parts shown in Fig. 4 to correspond with normal current flow through the coil 61, or that the tube 66 is raised but slightly from the position indicated in Fig. 4 for normal current flow; the magnetic effect produced by the coil 61 when increased by an increase of the current flow, produces a greater lifting effect on the tube 66, than is produced upon it by normal current flow and when the current flow in the coil 61 reaches a predetermined limiting value for which the device is set to exercise its control, the liquid 71 is raised sufficiently to make contact with the terminal 64, thus establishing electrical connection between the terminals 64 and 65 through the liquid 71, the cup 70, the tube 66, and the liquid 69. The disc 67, which preferably is provided with an upturned edge as indicated, and the perforations 66a and 67a serve to prevent immediate response of the device to an abnormal rush of current, since under these conditions the tendency is for the tube 66 and the disc 67 to lift the liquid contained in them instead of only lifting the tube and disc in the liquid. In this way a time element is introduced into the operation of the device, insuring that it shall not make contact between the terminals 64 and 65 in the event the abnormal current flow is of so short duration as to do no harm to the connected apparatus. On the other hand, in the event the abnormal current flow is maintained for an appreciable interval, the tube 66 is raised slowly, but certainly, to bring the liquid 71 into engagement with the terminal 64 to secure the contemplated operation of the control circuit. It will further be observed that the predetermined excess current flow above normal current flow through the coil 61, for which the device will close its control circuit, may be accurately set and maintained even where the abnormal current value is but slightly in excess of the normal current value.

While I have described the construction shown in Fig. 4 as effective in protecting a desired circuit from an abnormal increase in current flow, in which case the winding 61 is proportioned and wound for series connection in the circuit to be protected, the same devices may be employed with equal effect to protect a desired circuit against an abnormal voltage increase by proportioning the winding 61 to withstand the normal voltage of the circuit and connecting said winding between the conductors of the circuit between which the voltage is to be maintained below a predetermined maximum value.

In Figs. 5 and 6 I show a construction of mechanism for protecting desired circuits and apparatus from abnormally high and abnormally low current flow or voltage, depending upon how the actuating coil of the device is wound and connected. In this construction the device is provided with an actuating coil 100 through which a tube 101 of insulating material, for example glass, extends, the tube being substantially the same as the tube 60 shown in Fig. 4 and the relation of the actuating coil to the tube being similar to that shown between the actuating coil 61 and the tube 60 in Fig. 4. The tube 101 is provided with a lower terminal 102 and an upper terminal 103 of conducting material projecting through the ends of the tube and in electrical connection with protecting caps 104 and 105 carried by the ends of the tube. The upper terminal 103 is branched on its inner end to form two contacts 103a and 103b, the former being axially disposed and the latter extending adjacent the inner side wall of the tube 101. The tube 101 contains liquid conductor, for example mercury, as indicated at 106 and in the liquid conductor a float of magnetic material, for example iron, is disposed as indicated at 107. The float 107 is provided at its upper end with a cup 107a containing liquid conductor, for example mercury as indicated at 108. On its outer surface the float 107 is grooved longitudinally as indicated at 107b, said grooves being lined with insulating material 109 so that the contact 103b may extend into one of said grooves without making electrical contact with the float 107. The float 107 carries at its lower end a perforated disc 110 secured in spaced relation to the end of the float by a central stud 111, said disc preferably having upwardly and downwardly projecting edge flanges as indicated. The parts of the device are so proportioned, and the level of the liquid conductor 106 is so taken, that under normal conditions of current flowing through the actuating winding 100, the contacts 103a and 103b will be out of contact with the liquid conductors 108 and 106 respectively. For this relation of the parts, with normal current flow through the winding 100, the float extends some distance above the upper end of the coil 100 and its lower end is just within the lower end of said coil. If now the current flowing through the coil 100 decreases to a predetermined value lower than the normal value, the magnetic pull on the float 107 is decreased sufficiently to permit it to rise until the contact 103a makes electrical connection with the conductor 108, thus closing the control circuit extending from the terminals 102 and 103. On the other hand if the current flowing through the coil 100 is increased above its normal value until a predetermined high value of current is reached, the magnetic pull on the float 107 is increased thus drawing it downwardly in the liquid conductor 106, for which condition the displaced liquid conductor 106 rises around the float until it makes electrical contact with the contact 103b, thus closing the control circuit extending from the terminals 102 and 103. It will be understood, that by changing the relation of the parts shown in Fig. 5, so the float 107 is normally below the coil 100, an abnormal increase of current flow will raise the float and close the control circuit through the contact 103a, and an abnormal decrease of current flow will permit the float to correspondingly sink and close the control circuit through the contact 103b.

The device just described may be constructed to actuate the control circuit for abnormally high and low current values in the protected circuit by so winding the coil 100 that it may be included in series in said circuit and the same device may be employed to protect a circuit against abnormally low and abnormally high voltage by winding the coil 100 so that it may be connected between the conductors of the circuit to be protected and subjected to the voltage between said conductors.

It will be noted that the disc 110 extends nearly to the inner surface of the tube 101, as a result of which motion of the disc either upwardly or downwardly in the liquid conductor, is retarded and a time element of operation is introduced determined by the amount of clearance between the disc and the tube 101 and the size of the apertures through the disc. In this manner closure of the control circuit is prevented for either a momentary increase or a momentary decrease of current flow from its normal value, although the same amount of change of flow might be sufficient, if maintained, to cause a closure of the control circuit.

In Figs. 7 and 8 I show a construction of device adapted to protect desired circuits against unbalanced current flow through the several conductors of the circuit or from unbalanced voltages between the several conductors of the circuit, as desired, depending upon the manner in which the actuating coils of the devices are wound and connected. In this construction I employ three actuating rods 141, 142 and 143 in substantially vertical position and equally spaced in substantially parallel relation to each other around a vertical central axis through the device. Each rod extends from a core contained in an actuating coil and connected with a dash pot construction. The rods 141, 142 and 143 are loosely connected at their upper ends with a rocking plate 144 having a central support 145 at the upper end of a column 146 supported by the stationary portion of the mechanism, said support 145 permitting a rocking movement of the plate 144 in any direction and comprising preferably a ball and socket joint having a retaining plate 145a for preventing upward movement of the plate 144 at its central portion away from the column 146. The plate 144 is engaged by similar, equally spaced springs 147 extending upwardly from said plate and connected at their upper ends with a bracket 148 supported by the base of the device. The springs 147 serve to hold the plate 144 in a horizontal plane when no pull is exerted on the rods 141, 142 and 143 by the corresponding actuating windings. The plate 144 supports an annular, closed receptacle 149 having a spherical bottom wall and provided on the outer portion of the inner surface of said bottom wall with two annular contacts 150 and 151 extending completely around the receptacle. Conducting wires 152 extend through the wall of the receptacle and make contact inside of the receptacle with the ring contacts 150 and 151. The receptacle 149 contains a small quantity of liquid conductor 153 which, for a horizontal position of the plate 144, rests upon the central portion of the lower wall of the receptacle 149 and out of contact with either of the contact rings 150 and 151. The receptacle 149 is of material not attacked by the liquid conductor, which is preferably mercury, for example glass, and the contact rings 150 and 151 are insulated from the liquid conductor and from each other when the plate 144 is in horizontal position. In using the device to protect against unbalanced current conditions in several conductors, the windings of the device are designed to be connected in series in the several conductors respectively, and for any condition of current flow in the conductors, as long as the current flowing in each conductor is equal to the current flowing in each of the other conductors, equal pulls are exerted upon the rods 141, 142 and 143 and these pulls are therefore balanced against each other by the connections of the rods to the plate 144 and the plate remains in horizontal position. When for any reason, however, the current flowing in one of the conductors, and therefore through the corresponding actuating coil, is of different amount from the current flowing in the other conductors and actuating windings, an unbalanced condition of pulls is produced upon the plate 144 and the plate is tilted a corresponding amount until a balanced condition of forces acting upon it, obtains. When this unbalanced condition reaches a predetermined amount the liquid conductor 153 flows from its central position in the receptacle 149, sufficiently towards the outer edge thereof to engage and make electrical connection between the ring contacts 150 and 151, which serves to close the control circuit extending from the wires 152. It will be understood that the amount of lack of balance beween the magnetic action of the actuating coils rquired to close the control circuit may be determined by the degree of curvature of the bottom of the receptacle 149 and the distance that the ring conductors 150 and 151 are from each other. Each of the dash pots employed in this construction operates to prevent the closure of the control circuit for any momentary lack of balance of the currents flowing in the several conductors, but on the other hand requiring a continuance of the unbalanced condition for an appreciable interval before the device will respond to the unbalanced pulls.

It will be understood that the device shown and described in connection with Figs. 7 and 8 may be employed to protect a desired circuit having a plurality of conductors, against unbalanced voltage conditions between the conductors by properly winding the actuating coils of the device for connection between the conductors of the circuit and that for this arrangement the device responds to unbalanced voltage conditions in the same manner as described above, to close the control circuit.

In some cases I find it advisable to provide a separate control circuit for each of the conductors of a multiconductor system to be protected against unbalanced voltages or currents of the system.

In Figs. 9 and 10 I show a modified construction of unbalanced voltage and current contact making mechanism for use where two voltages or currents are to be maintained in balanced relation and in this construction the receptacle 149$b$ has two arms and is provided at its ends with contacts as indicated for controlling the operation of either one of two control circuits and the plate 144$c$ is provided with diametrically opposite points of connection for two operating rods similar to the rods 141, 142 and 143. In this case the actuating mechanism shown in Figs. 7 and 8 is modified so that but two actuating coils are used, which are located on opposite sides of the axis of the plate 144$c$ to bring the coils in line with the points of connection of the rods with the plate 144$c$.

It will be understood that the mechanism shown in Figs. 7 and 8 for effecting control for unbalanced current and unbalanced voltage conditions in an electrical system, may readily be adapted to the requirements of any particular case. For example, the number of currents or voltages required by the system to be maintained in balance may be some other number than two or three. In that case, all that is necessary is to provide one actuating coil for each of the currents or voltages required to be maintained in balanced relation, spacing the coils uniformly around the vertical axis of the device, and equally spacing the connections of the operating rods with the equalizing plate in a corresponding manner. The contact receptacle 149 may be used without change for any such case. If, however, a contact receptacle of the type shown in Figs. 9 and 10 is preferred, all that is necessary is to provide it with a number of equally spaced arms and pairs of control contacts corresponding with the number of actuating coils required.

In Fig. 11 I show diagrammatically a three phase alternating current system provided with overload fuses and having a unit circuit breaker construction of the kind above described connected in each conductor of the system in position to protect the operated apparatus. The system shown in this figure consists of a three phase generator G connected by conductors 166, 166$a$, 166$b$ with a main switch 167 from which conductors 168, 168$a$, 168$b$ extend each to one main contact of the circuit breaker mechanisms 10, 10, 10$b$, the other main contacts of which are connected respectively by conductors 169, 169$a$, 169$b$ with fuses 170, 170$a$, 170$b$ which are in turn connected with the conductors 171, 171$a$, 171$b$ extending to the apparatus to be operated, for example a polyphase motor M. The tripping coil 214 of the circuit breaker 10 is connected with conductor 168$a$ by wire 172 and with one terminal of the auxiliary circuit breaker 36 the other terminal of which is connected with wire 173 extending to one or more remote control stations A and B, the return wire 174 from which is connected with wire 171$a$. The tripping coil 214$a$ is connected by wire 172$a$ with wire 168$b$ and with one terminal of the auxiliary circuit breaker 36$a$ the other terminal of which is connected by wire 173$a$ with the wire 171$b$. The tripping coil 214$b$ is connected by wire 172$b$ with wire 168 and with the auxiliary circuit breaker 36$b$ the other terminal of which is connected by wire 173$b$ with wire 171.

The wire 173 extends to a switch or push button 175 the back contact of which is connected by wire 176 with a switch or push button 177 the back contact of which is connected with wire 174, the effect of the switches 175 and 177 at the remote control stations A and B respectively, being in their normal position to establish electrical connection between the wires 173 and 174.

As a result of the connections and construction of apparatus above described when one of the fuses, for example the fuse 170, blows due to abnormal current flow through the wire 169, a considerable difference of potential will be established between wires 172$b$ and 173$b$, since these wires are connected with wires 168 and 171 respectively in electrical connection with the terminals of the gap formed by the blowing of the fuse 170. With the fuse 170 in place, the voltage drop between the wire 168 and the wire 171 is practically zero, on account of the resistance between said wires being practically zero, for which condition the current flow through the tripping coil 214$b$ is practically zero. When the fuse 170 blows, however, a considerable difference of potential is impressed upon the wires 168 and 171, causing sufficient current to flow through the tripping coil 214b to release the circuit breaker 10b and interrupt connection between the wires 168b and 169b. With the circuit breaker 10b in its closed position and the fuse 170b intact, the current flowing through the tripping coil 214a of circuit breaker 10a is practically zero for the reasons above stated, but upon the opening of the circuit breaker 10b a considerable difference of potential is impressed upon the wires 172a and 173a, energizing the tripping coil 214a to open the circuit breaker 10a. In a manner similar to that above described, the opening of the circuit breaker 10a impresses a considerable potential difference upon the wires 172 and 174, thus energizing the tripping coil 214 to open the circuit breaker 10. In this manner the circuit breakers are opened one after another in rapid succession, by the blowing of the fuse 170 in the sequence 10b, 10a, 10. As a result of the circuit breaker construction above described, the opening of the circuit breaker 10b is immediately followed by the opening of the auxiliary circuit breaker 36b, which opens the circuit of the tripping coil 214b, and the other tripping coils 214a and 214 are similarly opened immediately after the opening of the corresponding circuit breakers 10a and 10 by the auxiliary circuit breakers 36a and 36.

It will be noted that the tripping coil connections in any case are made to span a part of the conductor with which the tripping coil is connected including the main contacts of a circuit breaker mechanism and one of the fuses, and that the difference of potential on the terminals of any tripping coil required to energize it to release the corresponding circuit breaker mechanism, may result either from the blowing of the corresponding fuse or the opening of the corresponding circuit breaker mechanism.

In a manner similar to that above described the blowing of the fuse 170a results in successive operation of the circuit breaker mechanisms in the sequence 10, 10b, 10a, and the blowing of the fuse 170b results in operation of the circuit breakers in the sequence 10a, 10, 10b.

As a result of the construction described, it will appear that my system provides complete overload protection for the polyphase circuit to be protected, assuming that any one of the fuses blows for a particular overload condition, or that the blowing of any fuse results from abnormal current flow in a corresponding conductor due to any reason that may not directly affect the remaining conductors of the system, and that this result is secured whether any of the remaining fuses blows or not. In this manner the possibility of single phasing action in the motor M is prevented, which action might otherwise occur through the remaining motor conductors being still connected with the supply circuit, and the windings of the motor being connected in a closed circuit arrangement such that current flows through all of them, when supplied to them by but two of the supply conductors. It will be understood that the motor M is merely illustrative of any polyphase apparatus that may be operated from the polyphase circuit and that any said actuated apparatus may have its windings conductively or inductively related and so produce the dangerous operating conditions referred to, unless the operating potentials are properly impressed upon them by all of the supply conductors.

The control of the protective apparatus from the remote stations A and B is effected through a wire 178 connected with the wire 171 and extending to normally open contacts of the switches 175 and 177. As a result of this arrangement, when either the switch 175 or 177 is operated, it interrupts connection between the wires 173 and 174 and establishes connection between the wire 173 and the wire 178. This results in interrupting the normal connection of the tripping coil 214 and establishing an alternate connection of said tripping coil between the wire 168a and the wire 171, between which wires there is always a potential difference sufficient to energize the tripping coil 214 and open the circuit breaking mechanism 10. As above described, the opening of any one of the circuit breakers, results in the opening of the remaining circuit breakers one after another in rapid succession, and thus a complete separation of the protected apparatus from the supply circuit, may be effected from either of the remote control stations A and B. This is a valuable feature of protection in case anything operated by the circuit of the protected system goes wrong although it may not be of a nature to operate the overload devices, and provides for completely cutting off the protected system from the supply circuit from any desired point of control, whether near the operated apparatus or not. It will be understood that there may be as many stations of remote control as desired, and that the remote control circuit may be connected with any desired one of the circuit breakers, the only requisite being that the operation of the remote control from any one of the remote control stations, shall energize one of the tripping coils 214, 214a, 214b to open the corresponding circuit breaker, which in the manner above described will result in the opening of the remaining circuit breakers one after another in rapid succession. It will be understood that while the overload devices are shown as fuses, they are considered to be the equivalent of any instrumentality that will produce a gap in the conductor through which an abnormal current is flowing, caused by the abnormal current flow.

While the system shown in Fig. 11 is a polyphase alternating current system, it will be understood that precisely the same arrangement of protective apparatus may be employed with any three conductor supply system, and, furthermore, that the three conductor system is merely illustrative of any multiconductor system since the same system of protective devices may be employed for a multi-conductor system having any number of conductors by using a corresponding number of circuit breakers and connecting them in accordance with the system of connections shown in Fig. 11.

In Fig. 12 I show a polyphase electric system diagrammatically, similar in its general aspects to the system shown in Fig. 11, but provided with more complete protection, the difference being the use of transformers between the supply conductors and the protected circuits and apparatus the use of fuse substitutes as overload and underload devices, the use of an unbalanced current device and the use of a phase reversal device, all having their control circuits extending to tripping coils on the circuit breakers used to protect the system.

In this system the wires 166, 166a, 166b extend from the generator G to the primary windings 179, 179a, 179b of a transformer or transformers T, provided with secondary windings 180, 180a, 180b, from the terminals of which conductors 168, 168a, 168b extend to and through the windings of the actuating coils 181, 181a, 181b of an unbalanced current device, to the main contacts of the circuit breakers 10, 10a, 10b, the other main contacts of which are connected respectively by wires 169, 169a, 169b with one terminal of the actuating coils 100, 100a, 100b, the other terminals of which are connected by wires 171, 171a, 171b with the windings of a polyphase motor M. In this system, the fuse substitutes for securing protection from overload and underload conditions, are represented by the windings 100, 100a, 100b. The control circuit from the device 100 extends by wires 182 and 183 to the wire 171 and to one terminal of the tripping coil 215 of the circuit breaker 10 respectively. The other terminal of the tripping coil 215 is connected by wire 184 with one terminal of the auxiliary breaker 36. The other terminal of the auxiliary breaker 36 is connected by wire 185 with the wire 168a. The control circuit of the device 100a is connected by wires 186 and 187 with the wire 171a and one terminal of the tripping coil 215a of circuit breaker 10a respectively, the other terminal of the tripping coil 215a being connected by wire 188 with one terminal of the auxiliary breaker 36a, the other terminal of which is connected by wire 189 with wire 168b. The control circuit of the device 100b is connected by wires 190 and 191 with wire 171b and one terminal of the tripping coil 215b of the circuit breaker 10b respectively, the other terminal of said tripping coil being connected by wire 192 with one terminal of the auxiliary breaker 36b, the other terminal of which is connected by wire 193 with wire 168.

As a result of the connections just described and the construction shown and described in connection with Fig. 4 above, when the current in one of the conductors reaches a predetermined value for which protection is desired, for example in the wire 169, the control circuit represented by the wires 182 and 183 is closed and the potential difference between the wires 168a and 171 is impressed on the tripping coil 215, thus causing operation of the circuit breaker 10 and the auxiliary circuit breaker 36 to interrupt connection between the wires 168 and 169 and to also interrupt the circuit of the tripping coils of the circuit breaker 10. Abnormal current flow in the wire 169a or 169b similarly operates the circuit breaker 10a or 10b through the tripping coil 215a or 215b by the potential difference between the conductors 171a and 168b or between the conductors 171b and 168 as the case may be.

The circuit breakers 10, 10a, 10b are provided with second tripping coils 214, 214a and 214b similar to the tripping coils shown in Fig. 11 and connected between wires 184 and 169a, wires 188 and 169b, and wires 192 and 169 respectively. The connections just described are similar to those described above for the tripping coils of the circuit breakers shown in Fig. 11 and operate in a similar manner, since each of said tripping coils is connected with the main terminals of another one of the main circuit breakers by the connections just described by the wires 185, 189 and 193 extending from the auxiliary circuit breakers. It therefore follows that while any one of the overload and underload devices, for example the device 100, only directly causes the opening of one of the circuit breakers, for example the circuit breaker 10, the opening of this circuit breaker in turn causes the opening of another of the circuit breakers which in turn causes the opening of the third circuit breaker, the operation of successively opening the circuit breakers being similar to that described above for Fig. 11 and for the same reasons and with the same results.

The unbalanced current device shown in Fig. 12 is provided with contact mechanism of the kind illustrated in Figs. 9 and 10, the individual control circuits of which extend by wires 194, 195, wires 196, 197, and wires 198, 199, to the several circuit breakers where wires 194, 196 and 198 are connected respectively with one terminal of the tripping coils 216, 216a and 216b of circuit breakers 10, 10a, 10b, the other terminals of which tripping coils are connected with wires 184, 188 and 192 respectively and thus to the circuits extending through the corresponding auxiliary circuit breakers. The wires 195, 197 and 199 are connected respectively with the wires 169, 169a and 169b.

As a result of the connections just described when the currents flowing through the windings 181, 181a, 181b are not substantially equal, or when they differ from each other by a predetermined amount, or again when any one of said currents differ from the currents flowing through the other conductors by a predetermined amount, although the remaining currents at the time may be equal to each other, the receptacle 149a is tilted to close one of the control circuits extending from the device for example the circuit 194, 195 extending from wire 169 through the wires 195, 194, tripping coil 216, wire 184, auxiliary breaker 36, wire 185 to wire 168a and, as a result of the difference of potential between the wires 169 and 168a, the tripping coil 216 is energized, which operates the circuit breaker 10 to interrupt the connection between the wire 168 and the wire 169. In a similar manner the other control circuits extending from the unbalanced current device operate to open one or the other of the circuit breakers 10a and 10b depending upon which of the other control circuits is closed. As pointed out above, the opening of any one of the circuit breakers, causes the opening of another of the series and this in turn of another, so that all of the circuit breakers are opened if, for any reason, one of the tripping coils 216, 216a and 216b is energized.

To protect the system shown in Fig. 12 against the ill effects of a reversal of one of the phases of the system, I provide a mechanism illustrated diagrammatically and consisting of a conducting drum 200 mounted on a spindle 201, to rotate within certain limits under the action of operating coils 202, 203 and 204. The coil 202 is connected by wires 205 and 206 with main conductors 168 and 168a respectively; the winding 203 is connected by wires 206 and 207 with main conductors 168a and 168b respectively; and the winding 204 is connected by wires 205 and 207 with main conductors 168 and 168b respectively. The spindle 201 carries a switch arm 208 normally engaging a stop 209, in which position it is held for a proper relation between the phases of the system, by the rotative action of the coils 202, 203 and 204 upon the drum 200. If for any reason the relation between the phases is reversed, as for example by the breaking of the supply conductors and improperly connecting them, the reversed phase relation exerts a rotative effect on the drum 200 in the opposite direction to that produced for a proper phase relationship between the currents flowing through the several windings of the device, and for this reversed condition, the arm 208 is rotated away from its stop 209 into engagement with the contacts 210 and 211, connected by wires 212 and 213 with one terminal of the tripping coil 217b of the circuit breaker 10b and wire 168b respectively. The other terminal of the tripping coil 217b is connected with wire 192. As a result of the construction just described, for a condition of phase reversal, the tripping coil 217b is energized by current flowing from wire 168b to wire 168 through the wires 213, 212, 192 and 193. The energization of the tripping coil 217b opens the circuit breaker 10b and, as a result of the interconnected relation of the other tripping coils of the several circuit breakers above referred to, the opening of the circuit breaker 10b causes the opening of the other circuit breakers of the system, one after another.

An important feature of protection secured with a system of the type shown in Fig. 12, is that if for any reason one of the main line wires of the system, represented by the wires 166, 166a and 166b, is broken and phase failure results in the primary circuits of the system, and a single phasing action is set up in the primary windings of the transformer or transformers T, which however is not communicated to the local conductors 168, 168a and 168b from the secondary windings of the transformer or transformers in the same relation that it exists in the primary windings or the conductors 166, 166a, 166b, the unbalanced current device will at once operate in the manner described to disconnect the entire system of protected apparatus and conductors from the main supply wires. For this condition, ordinary overload devices, such as fuses or otherwise, would afford no protection for the local conductors or connected apparatus it is desired to protect. With such a condition, however, an unbalanced current condition inevitably results and this is effective in tilting the receptacle 149a and causing the energization through one of its control circuits, of one of the tripping coils of the circuit breaker system shown in Fig. 12, and this in turn for the reasons set forth, results in the opening of all of the circuit breakers thus completely protecting the local circuits and apparatus.

It will be observed that with the protective system illustrated in Fig. 12, complete protection is afforded the protected circuits and apparatus against single phasing and phase failure of any kind that otherwise might result from a break or gap in any of the main conductors between the transformers and the protected apparatus. For on the one hand, if a break occurs in one of said main conductors between the transformers and the points of connection to the main conductors of the protective circuits, or between the points of connection to the main conductors of the protective circuits and the apparatus to be protected, a condition of unbalanced current flow at once results, and the unbalanced current device promptly operates as above described to completely disconnect the protected circuits and apparatus from the supply conductors; on the other hand, a break or gap in any of the main conductors between the points of connection thereto of the protective circuits, besides tending to open the main circuit breakers in the manner just referred to by operation of the unbalanced current device, will also be effective to energize a corresponding other one of the tripping coils, entirely disconnecting the protected system, thus affording a double protection against breaks in the main conductors of the kind last mentioned.

In Fig. 13 I show diagrammatically a polyphase alternating current system similar to the system shown in Fig. 12, but with the difference that in connection with the system shown in Fig. 13, I employ an unbalanced voltage protective device instead of an unbalanced current protective device as shown in Fig. 12, said unbalanced voltage protective device being provided with but a single control circuit instead of separate control circuits, as illustrated for the unbalanced current protective device shown in Fig. 12, the arrangement and connection of the generator G, transformer or transformers T, circuit breakers 10, 10a and 10b, overload and underload protective devices 100, 100a, 100b and motor M being the same as shown in Fig. 12. The circuit breakers 10, 10a, 10b shown in Fig. 13 are provided with tripping coils 214, 214a, 214b and 215, 215a, 215b for the same purpose and connected and operating in the same manner as shown and described in connection with Fig. 12, with the exception that the coil 214a is connected by wire 172c with contact 32c of the circuit breaker 10b and the cooperating contact 32d is connected with wire 171b by wire 172d. As a result, when the circuit breaker 10b is operated, it closes the contacts 32c and 32d and thus connects the tripping coil 214a with the wire 171b.

In the system shown in Fig. 13 the unbalanced voltage protective device is provided with actuating windings 181c, 181d and 181e acting upon a contact receptacle 149 in the same manner described above in connection with Figs. 7 and 8. The terminals of the winding 181c are connected by wires 242 and 243 with conductors 168b and 168a respectively; the terminals of the winding 181d are connected by wires 242 and 244 with conductors 168b and 168 respectively; and the terminals of winding 181e are connected by wires 243 and 244 with conductors 168a and 168 respectively. As a result of these connections the several windings are subjected respectively to the voltages between the conductors 168, 168a and 168b and any lack of balance between these voltages results in operation of the receptacle 149 in the manner above described. The receptacle 149 is of the ring contact type shown in Figs. 7 and 8 and from said contacts the wires 194a and 195a extend respectively to the conductor 168 and one terminal of a tripping coil 216c on the circuit breaker 10, the other terminal of which tripping coil is connected with wire 184. The operation of the unbalanced voltage device, when for any reason the difference between the voltages impressed upon its windings reaches a predetermined limit, closes the circuit of the tripping coil 216c and opens the circuit breaker 10 in the manner above described and also as above described, the opening of the circuit breaker 10 results in the opening of the other circuit breakers one after another, through the operation of the tripping coils 214b, 214a and 214. As shown in Fig. 13 a phase reversal protective device is employed which is of the same construction as shown in Fig. 12. In Fig. 13 the winding 202 is connected by wires 245 and 212a with the conductors 168 and 168a respectively; the winding 203 is connected by wires 212a and 246 with conductors 168a and 168b respectively; and the winding 204 is connected by wires 247 and 248 with conductors 168b and wire 193 respectively, the wire 248 being connected through wire 193 with conductor 168. The connections of the windings of the phase reversal protective device, are connected to the conductors 168, 168a and 168b in the same relation as shown in Fig. 12 and the device is operated in the same manner as described in connection with Fig. 12. The device is provided with contacts 211 and 210, which are the same as described in connection with Fig. 12 and for the same purpose, said contacts being connected respectively by wires 212a and 213a with conductors 168a and one terminal of tripping coil 217a of circuit breaker 10a, the other terminal of which is connected with wire 188. The phase reversal protective device therefore operates the circuit breaker 10a under the same conditions as the circuit breaker 10b is operated by the corresponding device in connection with the system shown in Fig. 12 and for the same purpose and with the same results; as a result of this arrangement and the connection of the tripping coils 214, 214a, 214b above described, the operation of the circuit breaker 10a results in the operation of the other circuit breakers one after another, in the manner above described, thus affording complete protection to the protected circuits and apparatus upon the operation of the phase reversal protective device.

In the system shown in Fig. 13, I illustrate diagrammatically, connections extending from the wires 168a and 182 for operating the circuit breakers to entirely disconnect the system, at any desired remote stations of control, for example the stations A1—B1. The control from the remote stations is effected by running two conductors 249 and 250 through all of the remote control stations and connecting said conductors at convenient points by wires 252 and 251 with wire 182 and one terminal of tripping coil 216k of circuit breaker 10, respectively. The other terminal of tripping coil 216k is connected with wire 184. At each remote control station, a switch or push button is located, as indicated at 253, 254, having its contacts normally in separated relation and connected respectively with the conductors 249 and 250. As a result of the connections last described, the closing of the contacts of any one of the control switches 253, 254 closes the control circuit extending through the tripping coil 216k, thus operating the circuit breaker 10. The circuit of the coil 216k is similar to the circuit of the coil 215 above described as controlled by the protective device 100, and opening the circuit breaker by the operation of the coil 216k produces the same results as above described in connection with the operation of coil 215.

In Fig. 14, I show a two phase alternating current system provided with protective devices of the kind above described. The system shown in this figure is substantially the same as that shown in Fig. 13 with the difference that the system of Fig. 14 is two phase and is provided with separate circuits for the two phases of the system, each circuit consisting of two conductors, instead of being a three wire system as shown in Fig. 13 and furthermore no phase reversal protective device is shown in connection with the system in Fig. 14.

As shown in Fig. 14 the two phase generator G1 is connected through separate circuits with the primary windings 179c and 179b of transformers T1 and T2, the secondary windings 180c and 180d of which are connected by wires 168c, 168d, 168e and 168f with the main contacts of circuit breakers 10c, 10d, 10e and 10f, the other main contacts of which are connected by wires 169c, 169d, 169e, 169f with the windings of the overload and underload protective devices 100c, 100d, 100e and 100f respectively, the other terminals of which windings are connected by wires 171c, 171d, 171e, and 171f with the windings of the motor M1. The contacts of the protective devices 100c, 100d, 100e and 100f are connected through control wires 183c, 183d, 183e and 183f with tripping coils 215c, 215d, 215e and 215f respectively. Tripping coils 214c, 214d, 214e and 214f are provided on the respective circuit breakers to cause the opening of breakers of different phases, one after another in substantially the manner above described in the other systems of operation, when any one of the circuit breakers is opened, the connecting of these tripping coils being similar to that described above and the only requisite in this connection being that the tripping coil of a circuit breaker of one phase shall be connected with the terminals of another circuit breaker of another phase, or have its energization determined by the opening of said other circuit breaker. In Fig. 14 separate auxiliary breakers 36c and 36c' are shown for the tripping coils 214c and 215c and corresponding separate auxiliary breakers 36d and 36d', 36e and 36e', and 36f and 36f' are shown for the other circuit breakers 10d, 10e and 10f, to insure that there shall be no improper connecting of the phases with each other, since the system is of the kind requiring each phase to have its separate circuit. It will further be noted that in connecting the tripping coils 214c, 214d, 214e and 214f, it is desirable that each tripping coil be connected with a conductor of the circuit of the other phase, so that each said tripping coil circuit controls the operation of a circuit breaker in the circuit of the other phase, when the circuit breakers of the several phases are operated one after another in the manner heretofore described.

The system shown in Fig. 14 is provided with an unbalanced voltage device having two actuating coils 181f and 181g controlling a contact receptacle 149b of the type shown in Figs. 9 and 10. One pair of contacts of the receptacle is connected by control wires 255 and 256 with conductor 168c and one terminal of tripping coil 216c of circuit breaker 10c, the other terminal of which tripping coil is connected with the auxiliary breaker 36c' and from said auxiliary breaker with the conductor 168d. The other pair of contacts of the receptacle 149b are connected by control wires 257 and 258 with the conductor 168f and one terminal of the tripping coil 216f of the circuit breaker 10f, the other terminal of which tripping coil is connected with the auxiliary breaker 36f' and from thence by wire 259 with conductor 168e. From this it will be noted that the control wires 255 and 256 are effective in causing current from the conductors 168c and 168d to flow through a tripping coil of a circuit breaker connected with the same phase and that the control wires 257 and 258 are similarly connected to the other phase. The actuating coil 181f of the unbalanced voltage device is connected by wires 260 and 261 with conductors 168c and 168d and the actuating winding 181g is connected by wires 262 and 263 with conductors 168e and 168f, as a result of which the voltage of one phase is impressed upon one of the actuating windings and the voltage of the other phase is impressed upon the other actuating windings and that therefore, in the manner above described, any lack of balance of the voltages of the two phases that amounts to the margin for which the unbalanced voltage protective device will close its control contacts, will result in closing one or the other of the control circuits, thus operating one of the circuit breakers referred to, which in turn causes the operation of one of the circuit breakers of the other phase thus completely protecting the system.

It will be understood that an unbalanced current device of the kind shown in connection with the system of Fig. 12 may be employed with a system of the kind shown in Fig. 14 by properly proportioning the windings of the device and connecting them in the manner indicated in Fig. 12. In this connection, it is necessary to have but two actuating windings since the two circuits of the system shown in Fig. 14 are conductively separate and distinct from each other. For similar systems involving a larger number of separate circuits, a corresponding number of actuating windings is employed.

It will be observed that in the system shown in Fig. 14 a circuit breaker is used in each of the two conductors of each of the separate circuits of the system and that, as a result of the circuits being electrically separate from each other, it is difficult, if not impracticable, to operate all of the circuit breakers of the system one after the other, in the same manner described in connection with Fig. 11, when for any reason a tripping coil of one of the circuit breakers is energized to open that particular circuit breaker. With the system shown and described in Fig. 14, however, provision is made for operating at least one circuit breaker of each separate circuit in a series relation of operation of said circuit breakers, in substantially the manner referred to in connection with Fig. 11, which, due to the separate relation of the circuits affords complete protection to the circuits and apparatus to be protected. It will be understood that any system of the kind illustrated in Fig. 14 may be protected in the same manner described above for the particular system shown in Fig. 14, regardless of the number of separate circuits there are in the system.

It will be understood that the systems shown in Figs. 11, 12, 13 and 14 are merely illustrative of various applications of my protective devices to electrical systems generally and that many changes may be made in the systems shown and that many other systems may be similarly protected without departing from the scope of my invention. For example, while in certain of the systems illustrated I show transformers between the generator and the protected circuits, it will be understood that the operation of my protective devices is substantially the same whether the system requires the use of transformers of the kind indicated, or on the other hand requires no transformers at all and furthermore, that transformers may be used with any system protected by my apparatus and that where transformers are used they may be of any particular construction and type required for any particular conditions.

While I find it preferable to use circuit breakers of the construction shown and described in connection with Figs. 1-3 inclusive, it will be understood that other constructions of circuit breakers may be employed where the unit circuit breaker construction is not specially desired. For example, as shown diagrammatically in Fig. 17, the circuit breaker may be of the multipole type, provided with a main releasing mechanism for the entire circuit breaker construction. In this construction the switch members of the circuit breaker are indicated at 264, 264a, 264b, which are pivotally mounted at 265, 265a, 265b upon a suitable fixed support so that they may simultaneously make connection with contacts 266, 266a, 266b included in the conductors to be protected by the operation of the circuit breaker. The members 264, 264a, 264b are pivotally connected with an operating link 267 and insulated therefrom and from each other, one end of the link being connected with a spring 268 to open the circuit breaker. The other end of the link 267 is provided with a catch 269 for engagement with a latch 270 when the circuit breaker is in its closed position, said latch being pivotally supported at 271, and pivotally connected at its other end with a core 272 acted upon by the various windings of the tripping coil 273. The coil 273 consists of a plurality of sections 273a, 273b, 273c, 273d and 273e, any of which when energized, is effective to move the latch from engagement with the catch 269 to permit the spring 268 to open the circuit breaker, these sections of the winding 273 corresponding with the several tripping coils described above for operating the circuit breakers under different conditions, and being adapted for connection and operation with my protective devices in a manner similar to that shown and described above.

If preferred, under certain conditions, a further modified form of circuit breaker construction may be employed of the type shown in Fig. 18, in which the circuit breaker consists of a plurality of main contact making members 274, 274a, 274b pivotally supported at 275, 275a, 275b, but in this case the construction provides for holding each of the members 274, 274a, 274b in its closed position independently of the other members, said members being provided with retaining hooks 276, 276a, 276b for engaging corresponding latches 277, 277a, 277b pivotally supported at 278, 278a, 278b, said latches being related so that when the latch 277 is operated to free the catch 276, it moves the latch 277a to disengage the catch 276a and that the operation of latch 277a in turn moves the latch 277b to disengage the catch 276b. The members 274, 274a, 274b are provided with springs 279, 279a, 279b, each tending to move the corresponding member to its open position to interrupt the circuit individually controlled by said member and when the retaining latches are moved to their operated position, said springs operate to move all of said members to their position opening the circuits controlled thereby. The latch 277 is pivotally connected with a core 272a for operation by a coil 273 of the same construction and for the same purpose as described in connection with Fig. 17. While circuit breakers of the construction indicated diagrammatically in Figs. 17 and 18 may be employed in connection with some systems to be protected by my apparatus, I do not consider them as desirable as the construction shown in Figs. 1–3 inclusive, on account of the difficulty of maintaining them in proper adjustment and repair and the further difficulty of installing them and replacing them, if for any reason they get out of order.

The unbalance protective device above described, may be provided with contact mechanism either of the ring type shown in Figs. 7 and 8 for connection with a common control circuit actuated for any condition of unbalance of the device, or of the individual control type shown in Figs. 9 and 10 for connection with separate control circuits actuated respectively for different conditions of unbalance of the device, each type of contact mechanism having its own advantages. The ring type of contact mechanism is of relatively simple construction affording protection against all conditions of unbalance resulting from undue abnormal unbalanced variations in current flow or voltage with the supply conductors connected with the source of current supply, while the individual control type of contact mechanism affords not only protection against conditions of unbalance just referred to, but in addition, all conditions of unbalance resulting from a broken supply wire. Protection of the kind last mentioned results from it being possible to connect each individual control circuit with a circuit breaker tripping coil controlling a conductor other than the broken one and supplying each control circuit with current from a circuit independent of the broken conductor. In this manner, while the ring type mechanism will protect against broken conductors under certain conditions, for example, for unbalanced voltage control with a non-inductive load, the individual contact mechanism will provide complete protection against unbalanced conditions, whether the unbalanced voltage or current control is used, and whatever may be the nature of the load.

In connection with the various types of electro-magnetically actuated protective devices above described, for example, the overload devices, the high-low devices and the devices for protecting the system from unbalanced electrical conditions, it will be observed that each of these devices is a circuit closer for a particular purpose as set forth, and that in connection with each of said devices during the normal operation of the system, a certain amount of current flows through the actuating winding of the device, whether the winding is proportioned for serial inclusion in one of the conductors of the system and therefore is preferably a low resistance, or on the other hand it is designed for voltage operation by being included between two points of the system of different potential in which case it is desirable to have the resistance of the winding relatively high; it will be noted that whether any of said circuit closing devices is intended for load current control or for voltage control, that the contact mechanism of the device is operated to control the circuit extending therefrom for an abnormal current flow through the operating winding of the device, and that as far as the construction of the protective device is concerned, the device is the same whether the operating winding be proportioned to effect the closure or control of the circuit extending from it for one particular current value or another for current control, or on the other hand the winding is proportioned for one voltage or another in connection with voltage control. In the claims below it will be understood that where particular reference is not made to the relation of the operating winding to the conductors of the system, the term normal current flow is employed in its broader significance just referred to as far as the current value is concerned and whether the current value results from the full load current flowing through the operating device or a comparatively small current flowing through the operating winding of the device from a derived circuit for voltage control, as long as the current flow, whatever its amount may be, is the current flow incident to the proper operation of the device and system for the conditions intended.

In the specification and claims, I make use of the terms "normal operation" and "normal current flow" to designate the operation of the system and mechanism under the conditions for which the system and apparatus are intended to operate, within whatever limits of variation may be provided for, as working limits in any particular case, and to designate the amount of current flow resulting from the use of the system and apparatus under working conditions for which the same are designed to operate, with whatever variations in current flow are provided for in any particular case, whether above or below the exact value of current flow for which proper operation of the system and apparatus will result. I also make use of the terms "abnormal operation" and "abnormal current flow", meaning thereby any operation and current flow outside of the scope of normal operation and current flow as above defined, and for which therefore it is desirable to afford protection to the system and apparatus.

It will be understood that many changes may be made in the constructions and systems illustrated without departing from the scope of my invention, inasmuch as the devices particularly illustrated are merely the preferred forms of my apparatus and the systems shown and described are merely illustrative of certain particular uses to which my protective apparatus may be put. For example, many other circuit arrangements may be made in connection with the use of my protective devices; many changes may be made in the particular construction of the protective devices themselves; other relations of the protective devices may be employed as desired; any of the overload protective devices shown and described may be employed in connection with any of the systems illustrated, either in the identical form shown or in other forms that may be required to meet any special cases; I do not therefore limit myself in carrying out my invention to the particular embodiments shown and described but I may employ equivalents known to the art at the time of the filing of this application without departing from the scope of the appended claims.

What I claim is:

1. In a system of the class described, the combination of a plurality of supply conductors forming a plurality of conductively separate supply circuits, a first tripping coil energized by current flow from a first one of said supply circuits, a first device controlled by said first coil for opening a second one of said supply circuits, a second tripping coil energized by current flow from said second supply circuit, a second device controlled by said second coil for opening said first supply circuit, a circuit controlling device connected with one of said conductors and responsive to abnormal electrical conditions in the corresponding supply circuit, and a circuit extending from said controlling device to control one of said opening devices.

2. In a system of the class described, the combination of a plurality of supply conductors forming a plurality of conductively separate supply circuits, circuit opening devices connected respectively with said supply circuits for actuation each by the opening of another of said supply circuits, a circuit controlling device connected with one of said conductors and responsive to abnormal electrical conditions in the corresponding supply circuit, and a circuit extending from said controlling device to control one of said opening devices.

3. In a system of the class described, the combination of a plurality of supply conductors forming a plurality of conductively separate supply circuits, a control circuit extending from each of said conductors for actuation by current flow in said conductor, a device connected with each conductor for opening the same, a tripping coil for each of said devices controlling its operation and connected with a control circuit extending from another of said supply circuits, each of said control circuits being actuated by the operation of the opening device connected with the corresponding conductor, a circuit controlling device connected with one of said conductors and responsive to abnormal electrical conditions in the corresponding supply circuit, and a circuit extending from said controlling device to control one of said opening devices.

4. In a system of the class described, the combination of a plurality of supply conductors forming a plurality of conductively separate supply circuits, a device connected with each conductor for opening the same, a tripping coil for each of said devices, a control circuit for each tripping coil for actuation from another of said supply circuits, said control circuits for corresponding conductors of the several supply circuits being arranged for successive actuation to open all of said supply circuits by the actuation of any one of said control circuits, a circuit controlling device connected with one of said conductors and responsive to abnormal electrical conditions in the corresponding supply circuit, and a circuit extending from said controlling device to control one of said opening devices.

5. In a system of the class described, the combination of a plurality of supply conductors forming a plurality of conductively separate supply circuits, a device connected with each conductor for opening the same, a tripping coil for each of said devices, a control circuit for each tripping coil for actuation from another of said supply circuits, each of said control circuits being actuated by operation of said opening device connected with the corresponding conductor, the control circuits actuated from corresponding conductors of the several supply circuits being arranged for successive actuation, whereby operating any of said devices opens all of said supply circuits, a circuit controlling device connected with one of said conductors and responsive to abnormal electrical conditions in the corresponding supply circuit, and a circuit extending from said controlling device to control one of said opening devices.

6. In a system of the class described, the combination of a plurality of supply conductors, a unit circuit breaker for each conductor having main contacts for opening and closing a conductive path through said conductor, spring actuated means tending to separate said contacts, devices for retaining said contacts in closed relation, and tripping coils for operating said devices to release said spring means, a control circuit extending from each of said conductors to a tripping coil associated with another of said conductors for actuation by current flow from the conductor from which it extends upon opening said conductor, a circuit closing device connected with one of said conductors and responsive to abnormal electrical conditions therein, and a control circuit extending from said circuit closing device to one of said tripping coils.

7. In a system of the class described, the combination of a plurality of supply conductors, a unit circuit breaker for each conductor having main contacts for opening and closing a conductive path through said conductor, spring actuated means tending to separate said contacts, devices for retaining said contacts in closed relation, and tripping coils for operating said devices to release said spring means, a control circuit extending from each of said conductors to a tripping coil associated with another of said conductors for actuation by current flow from the conductor from which it extends upon opening said conductor, a circuit closing device connected with each of said conductors and responsive to overload current flow therein, and a control circuit extending from each of said circuit closing devices to one of said tripping coils.

8. In a system of the class described, the combination of a plurality of supply conductors, a unit circuit breaker for each conductor having main contacts for opening and closing a conductive path through said conductor, spring actuated means tending to separate said contacts, devices for retaining said contacts in closed relation, and tripping coils for operating said devices to release said spring means, a control circuit extending from each of said conductors to a tripping coil associated with another of said conductors for actuation by current flow from the conductor from which it extends upon opening said conductor, a circuit closing device connected with each of said conductors for actuation by electrical conditions above and below predetermined limits, and a control circuit extending from said circuit closing device to one of said tripping coils.

9. In a system of the class described, the combination of a plurality of supply conductors, a unit circuit breaker for each conductor having main contacts for opening and closing a conductive path through said conductor, spring actuated means tending to separate said contacts, devices for retaining said contacts in closed relation, and tripping coils for operating said devices to release said spring means, a control circuit extending from each of said conductors to a tripping coil associated with another of said conductors for actuation by current flow from the conductor from which it extends upon opening said conductor, said conductors comprising a plurality of conductively separate supply circuits, a first of said control circuits extending from a first conductor of a first one of said supply circuits to a tripping coil associated with a first conductor of a second of said supply circuits, and a second of said control circuits extending from said first conductor of said second supply circuit to a tripping coil associated with a second conductor of said first supply circuit.

10. In a system of the class described, the combination of a plurality of supply conductors, a unit circuit breaker for each conductor having main contacts for opening and closing a conductive path through said conductor, spring actuated means tending to separate said contacts, devices for retaining said contacts in closed relation, and tripping coils for operating said devices to release said spring means, a control circuit extending from each of said conductors to a tripping coil associated with another of said conductors for actuation by current flow from the conductor from which it extends upon opening said conductor, said conductors comprising a plurality of conductively separate supply circuits, said control circuits being arranged in a sequence of control extending successively from a first conductor of any of said supply circuits to a first conductor of each of the remaining ones of said supply circuits and from the first conductor of the last of said supply circuits in the sequence successively to a second conductor of each of said supply circuits.

11. In a system of the class described, the combination of a plurality of supply conductors forming a plurality of conductively separate supply circuits, a first tripping coil energized by current flow from a first one of said supply circuits, a device controlled by said first coil for opening a second one of said supply circuits, a second tripping coil energized by current flow from said second supply circuit, a second device controlled by said second coil for opening said first supply circuit, a circuit controlling device connected with one of said conductors and responsive to electrical conditions above and below predtermined limits in the corresponding supply circuit, and a circuit extending from said controlling device to control one of said opening devices.

12. In a system of the class described, the combination of a plurality of supply conductors forming a plurality of conductively separate supply circuits, a control circuit for each of said conductors actuated by current flow therein, a device connected with each conductor for opening the same, a tripping coil for each of said devices controlling its operation and connected with a control circuit actuated from another of said supply circuits, a circuit controlling device connected with one of said conductors and responsive to electrical conditions above and below predetermined limits in the corresponding supply circuit, and a circuit extending from said controlling device to control one of said opening devices.

13. In a system of the class described, the combination of a plurality of supply conductors forming a plurality of conductively separate supply circuits, a device connected with each conductor for opening the same, a tripping coil for each of said devices, a control circuit for each tripping coil for actuation from another of said supply circuits, each of said control circuits being actuated by operation of said opening device connected with the corresponding conductor, the control circuits actuated from corresponding conductors of the several supply circuits being arranged for successive actuation, whereby operating any of said devices opens all of said supply circuits, a circuit controlling device connected with one of said conductors and responsive to electrical conditions above and below predetermined limits in the corresponding supply circuit, and a circuit extending from said controlling device to control one of said opening devices.

14. In a system of the class described, the combination of a plurality of supply conductors constituting different circuits, a circuit controlling means connected with said circuits and responsive to unbalance between an electrical condition in one of said circuits and a similar condition in another of said circuits, a control circuit extending from said means, a circuit opening device in each of said conductors, a tripping coil for each of said circuit opening devices connected with another of said conductors for actuating said circuit opening device upon the opening of the conductor to which it is connected, and an additional tripping coil for one of said circuit opening devices connected with said control circuit.

15. In a system of the class described, the combination of a plurality of supply conductors constituting different circuits, a circuit controlling means connected with said circuits and responsive to unbalance between an electrical condition in one of said circuits and a similar condition in another of said circuits, a control circuit extending from said means, a circuit opening device in each of said conductors, a tripping coil for each of said circuit opening devices connected with another of said conductors for actuating said circuit opening device upon the opening of the conductor to which it is connected, and an additional tripping coil for one of said circuit opening devices connected with said control circuit, said first mentioned tripping coils being responsively connected sequentially with said conductors.

16. In a system of the class described, the combination of a plurality of supply conductors constituting different circuits, a circuit controlling means connected with said circuits and responsive to unbalance between an electrical condition in one of said circuits and a similar condition in another of said circuits, a control circuit extending from said means, a circuit opening device in each of said conductors, a tripping coil for each of said circuit opening devices connected with another of said conductors for actuating said circuit opening device upon the opening of the conductor to which it is connected, and an additional tripping coil for one of said circuit opening devices connected with said control circuit, said first mentioned tripping coils being in a closed sequential arrangement of operation, whereby actuating any one of said circuit opening devices opens all of said conductors one after another.

17. In a system of the class described, the combination of a plurality of supply conductors forming a plurality of conductively separate supply circuits, a first tripping coil energized by current flow from a first one of said supply circuits, a first device controlled by said first coil for opening a second one of said supply circuits, a second tripping coil energized by current flow from said second supply circuit, a second device controlled by said second coil for opening said first supply circuit, a circuit controlling device connected with the conductors of two of said supply circuits and responsive to an unbalance between an electrical condition in one of said two supply circuits and a similar condition in the other of said two supply circuits, and a circuit extending from said circuit controlling device to control one of said opening devices.

18. In a system of the class described, the combination of a plurality of supply conductors forming a plurality of conductively separate supply circuits, a control circuit extending from each of said conductors for actuation by current flow in said conductor, a device connected with each conductor for opening the same, a tripping coil for each of said devices controlling its operation and connected with a control circuit extending from another of said supply circuits, a circuit controlling device connected with the conductors of two of said supply circuits and responsive to an unbalance between an electrical condition in one of said two supply circuits and a similar condition in the other of said two supply circuits, and a circuit extending from said circuit controlling device to control one of said opening devices.

19. In a system of the class described, the combination of a plurality of supply conductors forming a plurality of conductively separate supply circuits, a control circuit extending from each of said conductors for actuation by current flow in said conductor, a device connected with each conductor for opening the same, a tripping coil for each of said devices controlling its operation and connected with a control circuit extending from another of said supply circuits, each of said control circuits being actuated by the operation of the device connected with the corresponding conductor, a circuit controlling device connected with the conductors of two of said supply circuits and responsive to an unbalance between an electrical condition in one of said two supply circuits and a similar condition in the other of said two supply circuits, and a circuit extending from said circuit controlling device to control one of said opening devices.

20. In a system of the class described, the combination of a plurality of supply conductors forming a plurality of conductively separate supply circuits, a device connected with each conductor for opening the same, a tripping coil for each of said devices, a control circuit for each tripping coil for actuation from another of said supply circuits, said control circuits for corresponding conductors of the several supply circuits being arranged for successive actuation to open all of said circuits by the actuation of any one of said control circuits, a circuit controlling device connected with the conductors of two of said supply circuits and responsive to an unbalance between an electrical condition in one of said two supply circuits and a similar condition in the other of said two supply circuits, and a circuit extending from said circuit controlling device to control one of said opening devices.

21. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, and a circuit extending from said controlling means to control one of said opening devices.

22. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, and a circuit extending from said controlling means to control one of said opening devices, said opening devices being responsively connected sequentially with said conductors in a closed cycle of operation.

23. In a system of the class described, the combination of a plurality of supply conductors, circuit opening devices connected respectively with said conductors for actuation each by the opening of another of said conductors, a circuit controlling means connected with one of said conductors and responsive to electrical conditions therein above and below predetermined limits, and a circuit extending from said controlling means to control one of said opening devices.

24. In a system of the class described, the combination of a plurality of supply conductors, circuit opening devices connected respectively with said conductors for actuation each by the opening of another of said conductors, a circuit controlling means connected with one of said conductors and responsive to electrical conditions therein above and below predetermined limits, and a circuit extending from said controlling means to control one of said opening devices, said opening devices being responsively connected sequentially with said conductors in a closed cycle of operation.

25. In a system of the class described, the combination of a plurality of supply conductors, circuit opening devices connected respectively with said conductors for actuation each by the opening of another of said conductors, a circuit closing device connected with one of said conductors and responsive to current flow above a predetermined limit, and a circuit extending from said closing device to control one of said opening devices.

26. In a system of the class described, the combination of a plurality of supply conductors, circuit opening devices connected respectively with said conductors for actuation each by the opening of another of said conductors, a circuit closing device connected with one of said conductors and responsive to current flow above a predetermined limit, and a circuit extending from said closing means to control one of said opening devices, said opening devices being responsively connected sequentially with said conductors in a closed cycle of operation.

27. In a system of the class described, the combination of a plurality of supply conductors, a circuit controlling means connected with said conductors and responsive to unbalance between electrical conditions therein, circuit opening devices connected respectively with said conductors for actuation each by the opening of another of said conductors, and a circuit extending from said controlling means to control one of said opening devices.

28. In a system of the class described, the combination of a plurality of supply conductors, a circuit controlling means connected with said conductors and responsive to unbalance between electrical conditions therein, circuit opening devices connected respectively with said conductors for actuation each by the opening of another of said conductors, and a circuit extending from said controlling means to control one of said opening devices, said opening devices being responsively connected sequentially with said conductors in a closed cycle of operation.

29. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, and a circuit extending from said controlling means to control one of said opening devices, each of said circuit opening devices comprising a circuit breaker independent mechanically of the others of said circuit opening devices and having main contacts controlling the conductive path through the corresponding conductor spring means tending to separate said contacts, devices for retaining said contacts in closed relation, and a tripping coil for operating said retaining devices to release said spring means, said control circuit being operatively connected with the tripping coil of the opening device to which it extends.

30. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, a circuit extending from said controlling means to control one of said opening devices, each of said circuit opening devices comprising a circuit breaker independent mechanically of the others of said circuit opening devices and having main contacts controlling the conductive path through the corresponding conductor, spring means tending to separate said contacts, devices for retaining said contacts in closed relation, and a plurality of separate tripping coils for operating said retaining devices to release said spring means, said control circuit being operatively connected with a tripping coil of the opening device to which it extends, and a second control circuit actuated by operation of said last named opening device and operatively connected with a tripping coil of another of said opening devices.

31. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, and a circuit extending from said controlling means to control one of said opening devices, each of said circuit opening devices comprising a circuit breaker independent mechanically of the others of said circuit opening devices and having main contacts controlling the conductive path through the corresponding conductor, spring means tending to separate said contacts, devices for retaining said contacts in closed relation, and a tripping coil for operating said retaining devices to release said spring means, said control circuit being operatively connected with the tripping coil of the opening device to which it extends, said control circuit being connected with the main contacts of one of said opening devices in a manner impressing upon said control circuit the electrical difference of potential between said main contacts to energize the tripping coil of another of said opening devices.

32. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, a circuit extending from said controlling means to control one of said opening devices, a fuse in each of said conductors, and a second circuit extending from the conductor connections of each of said fuses to control one of said opening devices.

33. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, a circuit extending from said controlling means to control one of said opening devices, each of said circuit opening devices comprising a circuit breaker independent mechanically of the others of said circuit opening devices and having main contacts controlling the conductive path through the corresponding conductor, spring means tending to separate said contacts, devices for retaining said contacts in closed relation, and a plurality of tripping coils for operating said retaining devices to release said spring means, said control circuit being operatively connected with a tripping coil of the opening device to which it extends, a fuse in each of said conductors, and a second circuit extending from each of said conductors at points spanning the main contacts and fuse therein to control a tripping coil of an opening device of another of said conductors.

34. In a system of the class described, the combination of a plurality of supply conductors, circuit opening devices connected respectively with said conductors for actuation each by the opening of another of said conductors, a circuit controlling means connected with one of said conductors and responsive to abnormal electrical conditions therein, a circuit extending from said controlling means to control one of said opening devices, each of said circuit opening devices comprising a circuit breaker independent mechanically of the others of said circuit opening devices and having main contacts controlling the conductive path through the corresponding conductor, spring means tending to separate said contacts, devices for retaining said contacts in closed relation, and a plurality of tripping coils for operating said retaining devices to release said spring means, said control circuit being operatively connected with a tripping coil of the opening device to which it extends, a fuse in each of said conductors, and a second circuit extending from each of said conductors at points spanning the main contacts and fuse therein to control a tripping coil of an opening device of another of said conductors, said opening devices being responsively connected sequentially with said conductors in a closed cycle of operation.

In witness whereof, I hereunto subscribe my name this 18th day of July, A. D. 1923.

LLOYD E. KING.